(12) United States Patent
Han et al.

(10) Patent No.: US 10,234,716 B2
(45) Date of Patent: Mar. 19, 2019

(54) LIQUID CRYSTAL DISPLAY DEVICE

(71) Applicant: Samsung Display Co., Ltd., Yongin-si, Gyeonggi-do (KR)

(72) Inventors: Jee Hoon Han, Yongin-si (KR); O Sung Seo, Hwaseong-si (KR); Kyung Suk Jung, Cheonan-si (KR); Yong Tae Cho, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/801,113

(22) Filed: Nov. 1, 2017

(65) Prior Publication Data

US 2018/0129099 A1 May 10, 2018

(30) Foreign Application Priority Data

Nov. 9, 2016 (KR) .................. 10-2016-0148747

(51) Int. Cl.
*G02F 1/1339* (2006.01)
*G02F 1/1335* (2006.01)
*G02F 1/1343* (2006.01)
*G02F 1/1362* (2006.01)

(52) U.S. Cl.
CPC ...... *G02F 1/133514* (2013.01); *G02F 1/1339* (2013.01); *G02F 1/1343* (2013.01); *G02F 1/136286* (2013.01)

(58) Field of Classification Search
CPC ............. G02F 1/133514; G02F 1/1339; G02F 1/1343; G02F 1/136286
See application file for complete search history.

(56) References Cited

U.S. PATENT DOCUMENTS

| 7,357,559 B2 | 4/2008 | Lee et al. |
| 8,031,320 B2 | 10/2011 | Lee et al. |
| 2005/0117093 A1* | 6/2005 | Kim .................. G02F 1/133514 349/106 |
| 2007/0279565 A1* | 12/2007 | Iwato ................ G02F 1/133711 349/139 |

FOREIGN PATENT DOCUMENTS

| JP | 2015-049434 | 3/2015 |
| KR | 10-2012-0056669 | 4/2012 |
| KR | 10-2016-0064373 | 8/2016 |

* cited by examiner

*Primary Examiner* — James Dudek
(74) *Attorney, Agent, or Firm* — Innovation Counsel LLP

(57) ABSTRACT

A liquid crystal display device includes a display area, a peripheral area, and a boundary area between the display area and the peripheral area and further includes: a first substrate; a switching element disposed on the first substrate in the display area; a pad disposed on the first substrate in the peripheral area and electrically connected with the switching element; a protective film disposed on the first substrate in the display area, the peripheral area, and the boundary area, and covering the switching element and the pad; a color filter disposed on the protective film in the display area; and a planarization film covering the color filter and contacting the protective film in the boundary area and the peripheral area. The planarization film is provided with a first opening overlapping the pad and at least one second opening formed in the boundary area.

19 Claims, 25 Drawing Sheets

LIQUID CRYSTAL DISPLAY DEVICE

This application claims priority from Korean Patent Application No. 10-2016-0148747 filed on Nov. 9, 2016 in the Korean Intellectual Property Office, the disclosure of which is incorporated herein by reference in its entirety.

BACKGROUND

1. Field of the Invention

The present disclosure relates to a liquid crystal display device, more particularly, a liquid crystal display device including an alignment liquid control groove.

2. Description of the Related Art

Generally, a liquid crystal display device includes two substrates facing each other and a liquid crystal material injected between the two substrates. A voltage is applied to the injected liquid crystal material to change the molecular arrangement of the liquid crystal material, thereby displaying an image. In such a liquid crystal display device, it is difficult to obtain a uniform molecular arrangement by merely injecting the liquid crystal material between the two substrates. Therefore, an alignment film is provided to align the molecular arrangement of the injected liquid crystal material in a predetermined direction.

The alignment film may be formed by applying a liquid solution that contains an alignment film forming material (hereinafter referred to as an alignment liquid) to a display area. In the process of applying the alignment liquid to the display area of the substrate, the alignment liquid may spread to an area other than the display area.

SUMMARY

Aspects of the present disclosure provide a liquid crystal display device that can control the spreadability of an alignment liquid.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

In accordance with one embodiment, a liquid crystal display device includes a display area, a peripheral area, and a boundary area between the display area and the peripheral area, and further includes: a first substrate; a switching element disposed on the first substrate in the display area; a pad disposed on the first substrate in the peripheral area and electrically connected with the switching element; a protective film disposed on the first substrate in the display area, the peripheral area, and the boundary area, and covering the switching element and the pad; a color filter disposed on the protective film in the display area; and a planarization film covering the color filter and contacting the protective film in the boundary area and the peripheral area, wherein the planarization film is provided with a first opening overlapping the pad and at least one second opening formed in the boundary area.

The liquid crystal display device may further include: an alignment film disposed on the planarization film without overlapping the pad, and the alignment film may overlap the second opening.

The second opening may continuously extend along one direction.

The liquid crystal display device of claim may further include: a gate line extending along a first direction on the first substrate and connected with the switching element and the pad, wherein the second opening may extend along a second direction intersecting the first direction.

The liquid crystal display device may further include: a spacer disposed on the planarization film in the display area; and a protrusion disposed on the planarization film in a region between the first opening and the second opening.

The spacer and the protrusion may be made of the same material.

A height of the spacer measured from one side of the first substrate may be higher than a height of the protrusion measured from one side of the first substrate.

A height of the spacer measured from one side of the planarization film may be substantially the same as a height of the protrusion measured from one side of the planarization film.

A height of the spacer measured from one side of the planarization film may be higher than a height of the protrusion measured from one side of the planarization film.

The switching element may include: a gate electrode disposed on the first substrate; a gate insulating film disposed on the gate electrode; a semiconductor pattern disposed on the gate insulating film; and a source electrode and drain electrode electrically connected with the semiconductor pattern, wherein the gate electrode and the pad may be made of the same material.

The liquid crystal display device may further include: a connection electrode disposed on the planarization film in the peripheral area, and connected with the pad through the first opening.

The liquid crystal display device may further comprise: a pixel electrode disposed on the planarization film, located in the display area, and electrically connected with the switching element, wherein the pixel electrode and the connection electrode may be made of the same material.

In accordance with another embodiment, a liquid crystal display device includes a display area, a peripheral area, and a boundary area between the display area and the peripheral area, and further includes: a first substrate; a protective film disposed on the first substrate in the display area, the peripheral area, and the boundary area; a color filter disposed on the protective film in the display area; and a planarization film covering the color filter in the display area, contacting the protective film in the boundary area and the peripheral area, and having one or more openings that expose at least a part of the protective film in the boundary area.

The one or more openings may be arranged in parallel in one direction at opposing sides of the display area.

The one or more openings may be arranged in a bar shape or a stitch pattern along one direction.

The one or more openings may surround an outer periphery of the display area.

The liquid crystal display device may further include: one or more spacers disposed on the planarization film in the display area; and one or more protrusions disposed on the planarization film in the boundary area in a region between the peripheral area and the one or more openings.

The one or more openings may continuously extend along one direction, and the one or more protrusions continuously extend along an outer periphery of the one or more openings.

The one or more openings and the one or more protrusions may be arranged in a zigzag fashion to be shifted along one direction.

The one or more openings may surround an outer periphery of the display area, and the one or more protrusions may surround an outer periphery of the one or more openings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Advantages and features of the present disclosure and methods of accomplishing the same may be understood more readily by reference to the following detailed description of various embodiments and the accompanying drawings. The present disclosure may, however, be embodied in many different forms and should not be construed as being limited to the embodiments set forth herein. Rather, these embodiments are provided so that this disclosure will be thorough and complete and will fully convey the inventive concept of the present disclosure to those skilled in the art.

It will also be understood that when a layer is referred to as being "on" another layer or substrate, it can be directly on the other layer or substrate, or one or more intervening layers may also be present. The same reference numbers may indicate the same components throughout the specification.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present disclosure.

Hereinafter, embodiments of the present disclosure will be described with reference to the attached drawings.

Figure 1:
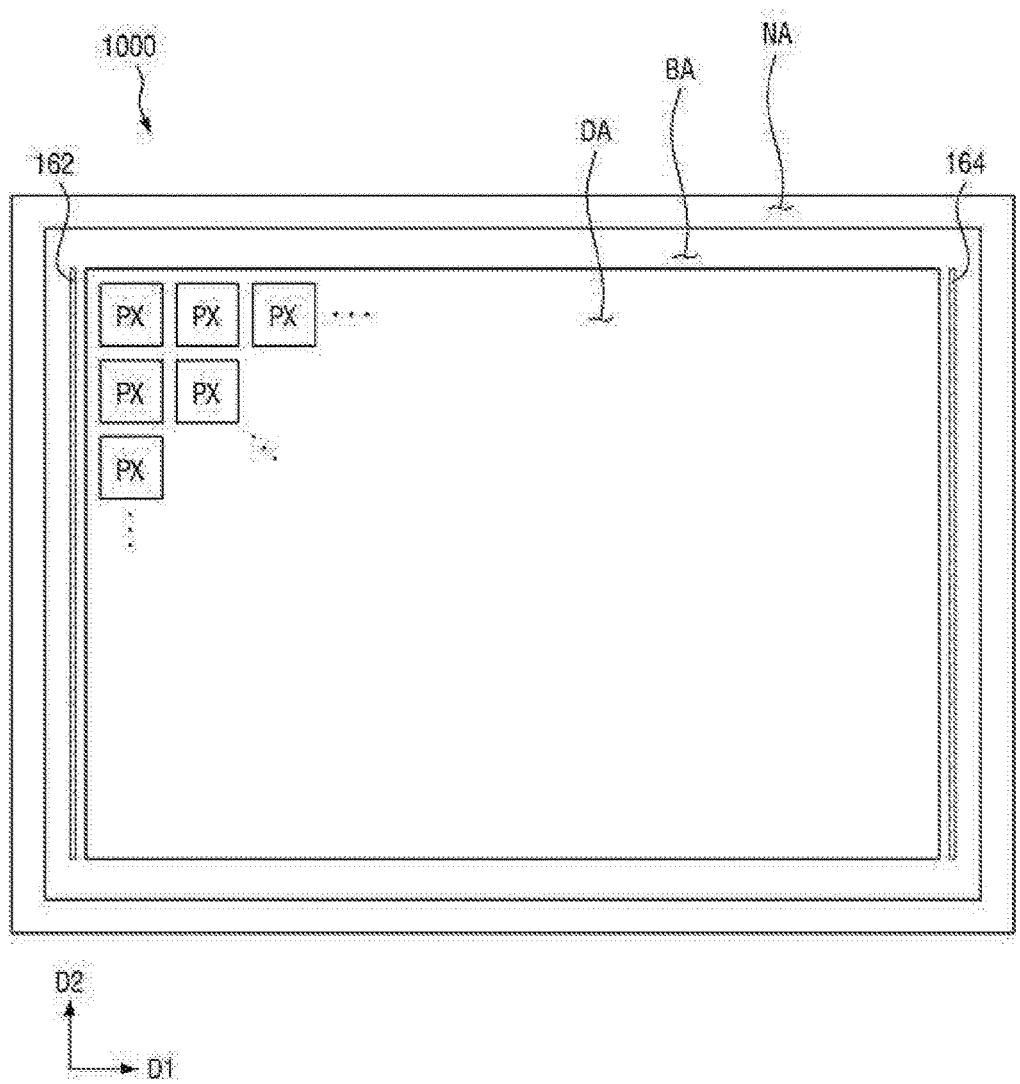
FIG. 1 is a plan view of a liquid crystal display device according to an embodiment of the present disclosure.
Figure 2:
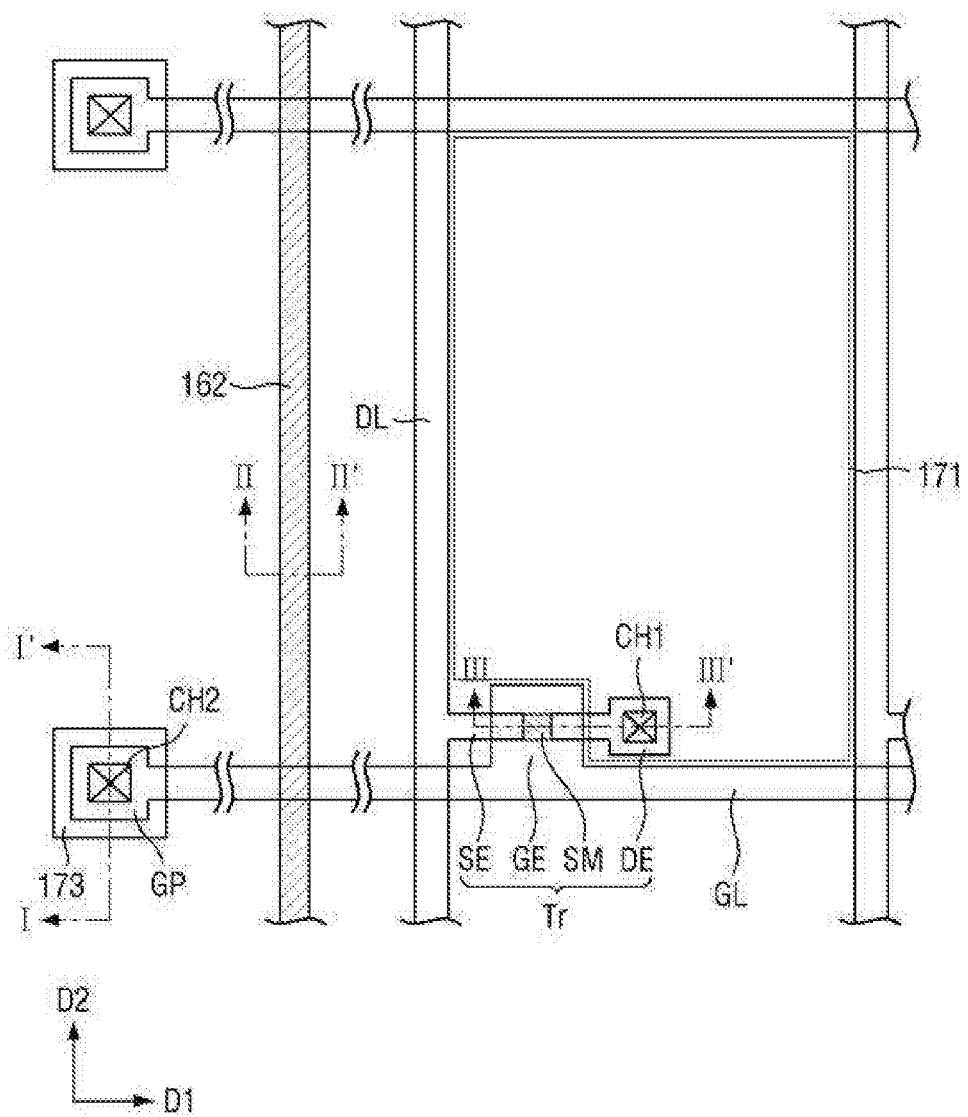
FIG. 2 is a partially enlarged view of a structure of one pixel in the liquid crystal display device according to an embodiment of the present disclosure.
Figure 3:
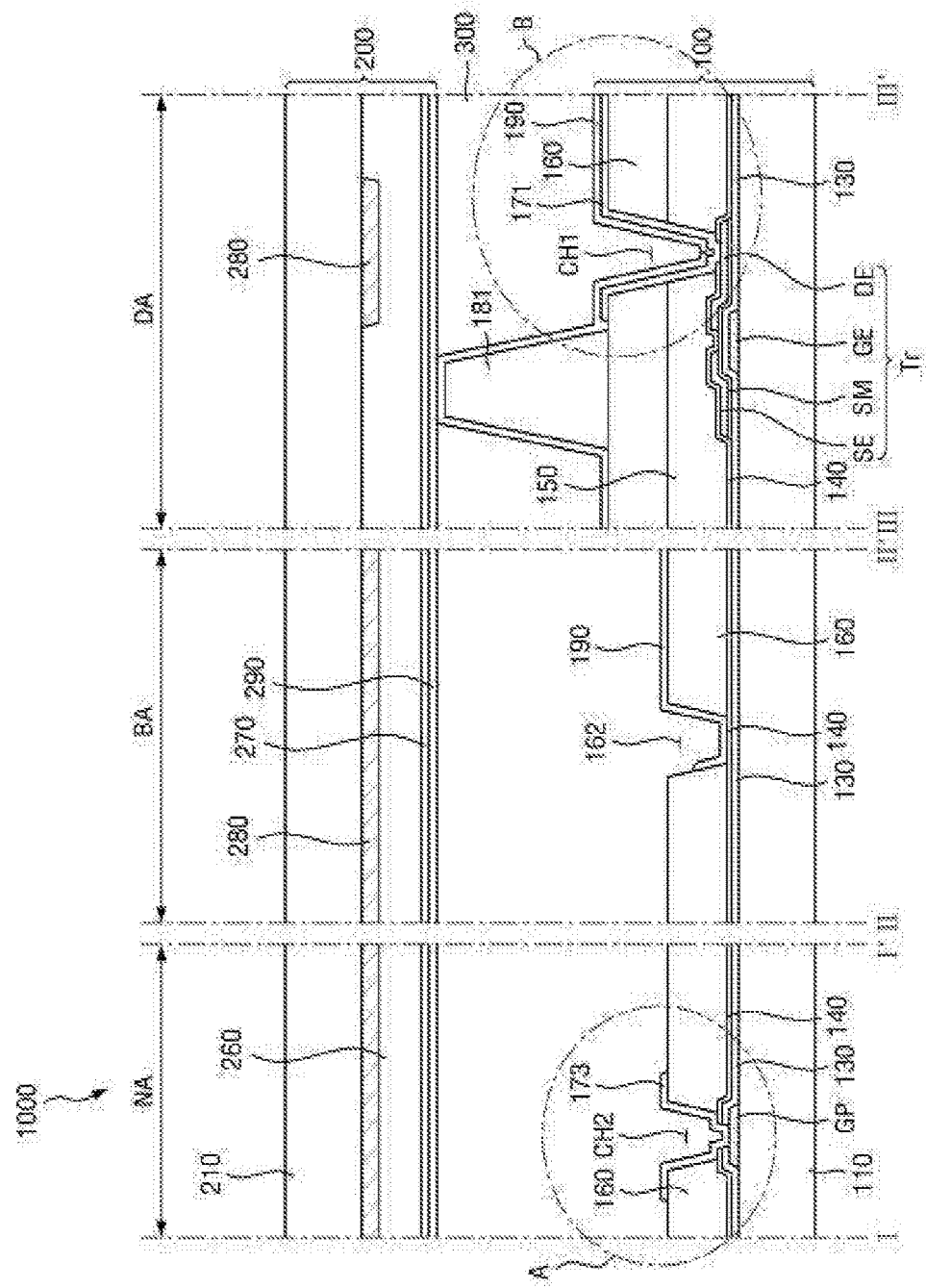
FIG. 3 is a sectional view of the liquid crystal display device shown in FIG. 2 taken along the lines I-I', II-II', and III-III'.

FIG. 1 is a plan view of a liquid crystal display device according to an embodiment of the present disclosure, FIG. 2 is a partially enlarged view of a structure of one pixel in the liquid crystal display device according to an embodiment of the present disclosure, and FIG. 3 is a sectional view of the liquid crystal display device shown in FIG. 2 taken along the lines I-I', II-II', and III-III'.

Figure 4:
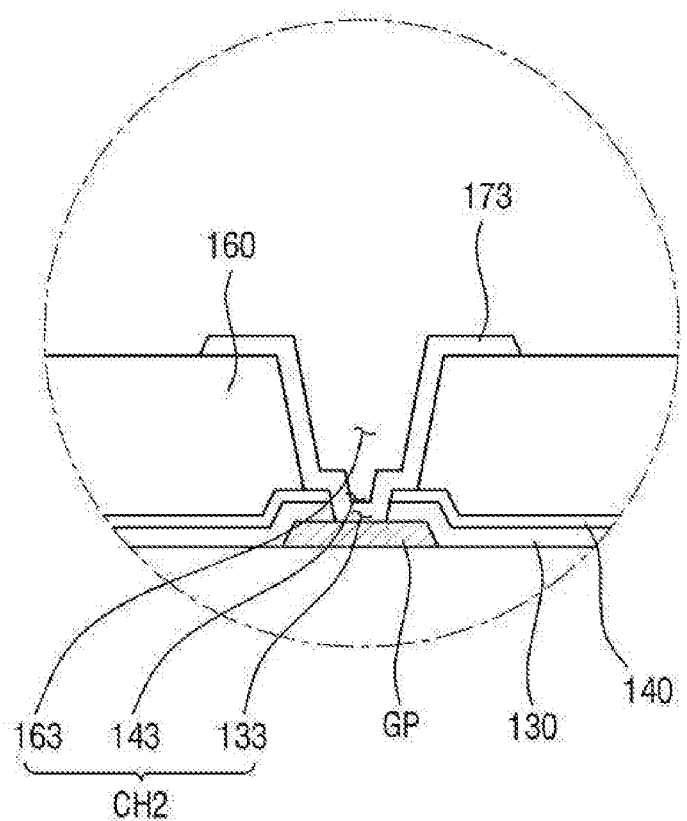
FIG. 4 is an enlarged view of the portion A of FIG. 3.
Figure 5:
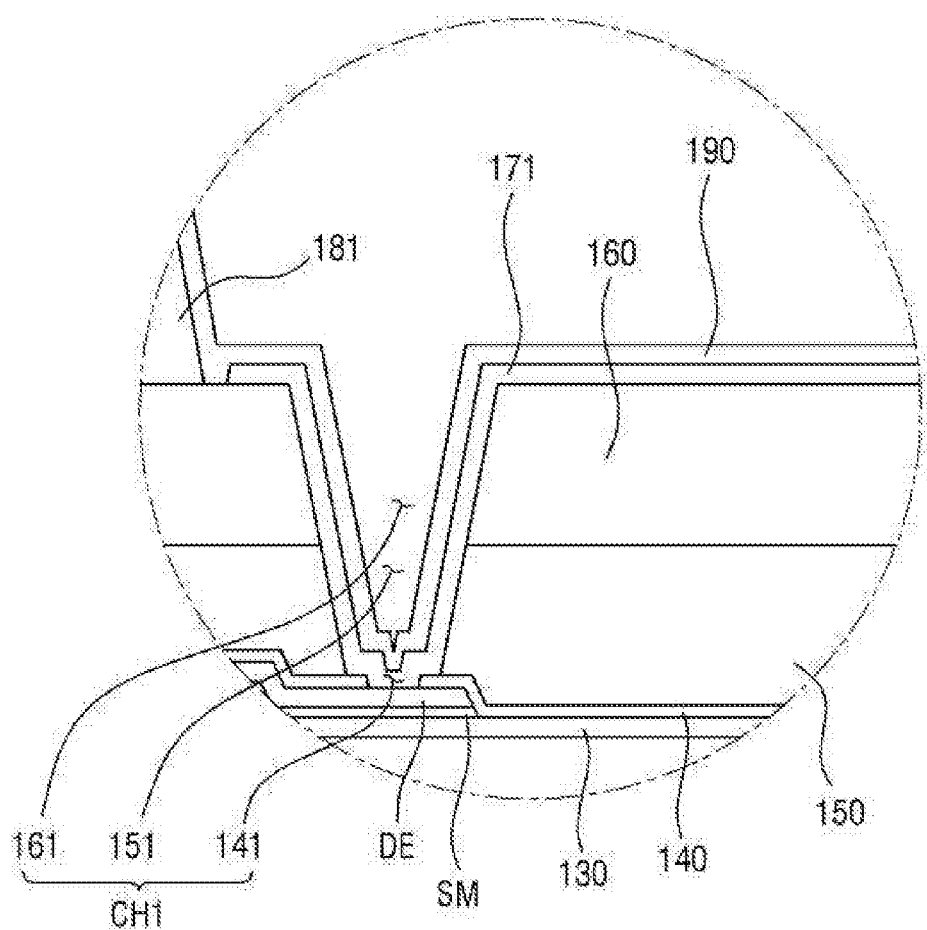
FIG. 5 is an enlarged view of the portion B of FIG. 3.

FIG. 4 is an enlarged view of the portion A of FIG. 3, and FIG. 5 is an enlarged view of the portion B of FIG. 3.

Referring to FIGS. 1 to 5, a liquid crystal display 1000 includes a display area DA, a peripheral area NA, and a boundary area BA between the display area DA and the peripheral area NA.

The display area DA is located at the center of the liquid crystal display 1000, and displays an image. The display area DA may have a rectangular shape, but the present disclosure is not limited thereto. For example, the display area DA may have a circular shape, or may have a closed curve shape with a curved rim, such as a display for a vehicle.

A plurality of pixels PX are arranged in the display area DA. In one embodiment, the pixels PX are arranged in the display area DA in a matrix shape. Each of the pixels PX includes a color filter 150, a pixel electrode 171, and a thin film transistor Tr.

The peripheral area NA is disposed around the display area DA. The peripheral area NA may be disposed to surround the display area DA.

A gate pad GP and a second contact hole CH2 exposing a part of the gate pad GP are disposed in the peripheral area NA. The gate pad GP may be connected to a connection electrode 173 through the second contact hole CH2.

The boundary area BA is disposed between the display area DA and the peripheral area NA.

An alignment liquid control groove 162 is disposed in the boundary area BA. The alignment liquid control groove 162 is located closer to the display area DA than the second contact hole CH2. The second contact hole CH2 and the alignment liquid control groove 162 may be formed in a first planarization film 160. That is, the alignment liquid control groove 162 may be openings disposed in the first planarization film 160. The alignment liquid control groove 162 can prevent an alignment liquid from spreading toward the peripheral area NA at the time of applying the alignment liquid for forming a first alignment film 190. As shown in FIG. 1, the alignment liquid control groove 162 may be located adjacent to one edge of the display area DA, more specifically, between the gate pad GP and the display area DA. In some embodiments, another alignment liquid control groove 164 may be disposed in the boundary area BA in an opposite side of the display area DA from the alignment liquid control groove 162. A detailed description of the alignment liquid control grooves 162 and 164 will be described later.

Hereinafter, a sectional structure of the liquid crystal display 1000 will be described in detail. As shown in FIG. 3, the liquid crystal display 1000 includes a first display panel 100, a second display panel 200 facing the first display panel 100, and a liquid crystal layer 300 interposed between the first display panel 100 and the second display panel 200.

Hereinafter, the first display panel 100 will be described.

The first display panel 100 includes a first substrate 110. The first substrate 110 may be a transparent insulating substrate. For example, the first substrate 110 may be a glass substrate, a quartz substrate, a transparent resin substrate, or the like.

A gate line GL extending in the first direction D1 and a gate electrode GE protruding from the gate line GL are formed on the first substrate 110 in the display area DA. The gate line GL may extend to the boundary area BA and the peripheral area NA, and a gate pad GP may be formed in the peripheral area NA.

The gate line GL, the gate electrode GE, and gate pad GP may contain an aluminum-based metal such as aluminum or an aluminum alloy, a silver-based metal such as silver or a silver alloy, a copper-based metal such as copper or a copper alloy, a molybdenum-based metal such as molybdenum or a molybdenum alloy, chromium, tantalum, or titanium.

A gate insulating film 130 is disposed on the first substrate 110, the gate line GL, and the gate electrode GE. The gate insulating film 130 may extend to the boundary area BA and the peripheral area NA.

A first opening 133 may be formed in the gate insulating film 130 to expose at least a part of the gate pad GP in the peripheral area NA.

The gate insulating film 130 may be made of an inorganic insulating material. For example, the gate insulating film 130 may be made of silicon oxide, silicon nitride, silicon oxynitride, or the like.

A semiconductor layer SM and an ohmic contact layer (not shown) are disposed on the gate insulating film 130 in the display area DA. The semiconductor layer SM may at least partially overlap the gate electrode GE. The semiconductor layer SM may contain amorphous silicon, polycrystalline silicon, or an oxide semiconductor. When the semiconductor layer SM is made of an oxide semiconductor, the ohmic contact layer may be omitted.

A data line DL extending in a second direction D2 intersecting the first direction D1 is disposed on the gate insulating film 130 and semiconductor layer SM. The data line DL may extend to the boundary area BA and the peripheral area NA. The gate line GL and the data line DL intersect with each other to define a pixel area that is surrounded by the gate line GL and the data line DL, and a pixel PX may be disposed in the pixel area.

A source electrode SE that is branched from the data line DL and a drain electrode DE that is spaced apart from the source electrode SE are disposed on the semiconductor layer SM in the display area DA. The source electrode SE and the drain electrode DE may at least partially overlap the gate electrode GE. The source electrode SE and the drain electrode DE may be connected with the semiconductor layer SM.

The data line DL may be made of aluminum, copper, silver, molybdenum, chromium, titanium, tantalum, or an alloy thereof.

The gate electrode GE, the source electrode SE, and the drain electrode DE may form a switching element together with the semiconductor layer SM. The switching element, herein also denoted as a thin film transistor Tr, may be disposed in the display area DA.

A protective film 140 is disposed on the gate insulating film 130, the data line DL, and the thin film transistor Tr in the display area DA. The protective film 140 may extend to the boundary area BA and the peripheral area NA.

A second opening 141 may be formed in the protective film 140 to expose at least a part of the drain electrode DE in the display area DA. A third opening 143 may be formed in the protective film 140 to overlap the first opening 133 and expose the part of the gate pad GP that is exposed through the first opening 133.

The protective film 140 may include an inorganic insulating material such as silicon oxide, silicon nitride, or silicon oxynitride. The protection layer 140 can protect the thin film transistor Tr, and can prevent a material contained in a color filter 150 from spreading into the semiconductor layer SM.

A color filter 150 may be disposed on the protective film 140 of the display area DA.

The color filter 150 may be any one of a red color filter, a green color filter, and a blue color filter. The color filter 150 may be disposed to overlap a pixel electrode 171. The color filter 150 may contain a photosensitive organic material containing a color pigment. The color filter 150 may be disposed only in the display area DA, and may not extend to the peripheral area NA and the boundary area BA.

A fourth opening 151 may be formed in the color filter 150 to overlap the second opening 141 and expose the part of the drain electrode DE that is exposed through the second opening 141.

A first planarization film 160 is disposed on the color filter 150 of the display area DA.

The first planarization film 160 may alleviate the step formed by the thin film transistor Tr or the color filter 150. The first planarization film 160 may extend to the boundary area BA and the peripheral area NA.

In the display area DA, the first planarization film 160 may be in direct contact with the color filter 150, and, in the peripheral area NA and the boundary area BA, the first planarization film 160 may be in direct contact with the protective film 140. In other words, in the peripheral area NA and the boundary area BA, the first planarization film 160 may be disposed directly on the protective film 140.

In some embodiments, the first planarization film 160 may be made of an organic material having photosensitivity.

A fifth opening 161 may be formed in the first planarization film 160 to overlap the second opening 141 and the fourth opening 151 in the display area DA. The second opening 141, the fourth opening 151, and the fifth opening 161 may form a first contact hole CH1 that exposes at least a part of the drain electrode DE. The first contact hole CH1 serves as a passage through which a pixel electrode 171 is electrically connected with the drain electrode DE.

An alignment liquid control groove 162 may be formed in the first planarization film 160 to expose at least a part of the protection layer 140 in the boundary area BA. In some embodiments, the alignment liquid control groove 162 may be a trench that penetrates the first planarization film 160 in the boundary area BA to expose the part of the protective film 140.

From the plan view as shown in FIG. 2, the alignment liquid control groove 162 may be formed in a stripe shape extending in the second direction D2 along the outer periphery of the display area DA and intersecting the gate line GL.

The alignment liquid control groove 162 may be disposed at the left and right sides of the boundary area BA that is disposed around the outer periphery of the display area DA. The alignment liquid control groove 162 may have various shapes such as a stick shape and a stitch pattern. However, the present disclosure is not limited thereto. The alignment liquid control groove 162 serves to prevent an alignment liquid 190a from spreading from the boundary area BA toward the peripheral area NA.

The arrangement of the alignment liquid control groove 162 will be described later in detail.

A sixth opening 163 may be formed in the first planarization film 160 to overlap the first opening 133 and the third opening 143 in the peripheral area NA. The first opening 133, the third opening 143, and the sixth opening 163 may form a second contact hole CH2 that exposes at least a part of the gate pad GP. The second contact hole CH2 serves as a passage through which a connection electrode 173 is electrically connected with the gate pad GP.

A pixel electrode 171 for each pixel PX may be disposed on the first planarization film 160 in the display area DA. The pixel electrode 171 may be connected with the drain electrode DE through the first contact hole CH1. The pixel electrode PE may be made of a transparent conductive material. For example, the pixel electrode PE may be made of Indium Tin Oxide (ITO) or Indium Zinc Oxide (IZO).

A connection electrode 173 may be disposed on the first planarization film 160 in the peripheral area NA. The connection electrode 173 serves to electrically connect a driving circuit (for example, a gate driving unit) and the gate pad GP through the second contact hole CH2. The connection electrode 173 may be made of a transparent conductive material. For example, the connection electrode 173 may be made of ITO or IZO. In some embodiments, the pixel electrode 171 and the connection electrode 173 may be made of the same material, and may be formed simultaneously in the same process.

A spacer 181 may be disposed on the first planarization film 160 in the display area DA. The spacer 181 may protrude toward the second display panel 200, and serves to maintain a cell gap between the first display panel 100 and the second display panel 200 by making contact with the second display panel 200. The spacer 181 may be made of an organic insulating material having photosensitivity.

The spacer 181 may be disposed to overlap at least a portion of the thin film transistor Tr. Resultantly, the size of a light-blocking pattern 280 formed in the second display panel 200 can be relatively reduced, and the aperture ratio of the liquid crystal display device 1000 can be improved. The spacer 181 may be a column spacer.

A first alignment film 190 may be disposed on the first planarization film 160 to cover the pixel electrode 171 and the spacer 181. The first alignment film 190 may be disposed not only in the display area DA but also in the boundary area BA, and a part of the first alignment film 190 may be disposed in the alignment liquid control groove 162.

Specifically, an alignment liquid 190a spreading to the outside of the display area DA in the process of forming the first alignment film 190 may be collected within the alignment liquid control groove 162 preventing the alignment liquid 190a from spreading toward the peripheral area NA. Accordingly, the first alignment film 190 may be terminated by the alignment liquid control groove 162 without reaching to the peripheral are NA. Therefore, the gate pad GP, the second contact hole CH2, or the connection electrode 173 may not overlap the first alignment film 190 preventing the first alignment film 190 from extending to the connection electrode 173 or the peripheral driving circuit (for example, a gate driving unit).

In addition, the first alignment film 190 serves to align the liquid crystal layer 300 by determining the alignment of liquid crystal molecules in the liquid crystal layer 300. The first alignment film 190 may be made of polyimide, polyamic acid, polyamide, polyester, polyethylene, polyurethane, polystyrene, or the like.

Next, the second display panel 200 will be described.

The second display panel includes a second substrate 210. The second substrate 210 may be a transparent insulating substrate. For example, the second substrate 210 may be a glass substrate, a quartz substrate, a transparent resin substrate, or the like. One side of the second substrate 210 may face the first display panel 100.

A light-blocking pattern 280 may be disposed on one side of the second substrate 210 in the display area DA. The light-blocking pattern 280 may be disposed at a position facing the first opening CH1 of the first display panel 100. Here, the light-blocking pattern 280 can prevent light leakage through the first opening CH1. The light-blocking pattern 280 may be made of a black organic polymer material containing a black dye or pigment. The light-blocking pattern 280 may contain a photosensitive material. The light-blocking pattern 280 may also be disposed in the boundary area BA and the peripheral area NA.

A second planarization film 260 may be disposed on the light-blocking pattern 280 in the display area DA. The second planarization film 260 may also be disposed in the boundary area BA and the peripheral area NA.

A common electrode 270 may be disposed on the second planarization film 260 in the display area DA. The common electrode 270 may be made of a transparent conductive material such as ITO or IZO. The common electrode 270 may also be disposed in the boundary area BA and the peripheral area NA. However, the disposition of the common electrode 270 in the liquid crystal display device 1000 according to the present disclosure is not limited thereto.

A second alignment film 290 may be disposed on the common electrode 270 in the display area DA. The second alignment film 290 may be disposed over the entire boundary area BA and/or the entire peripheral area NA.

The first display panel 100 and the second display panel 200 are disposed to face each other. A liquid crystal layer 300 may be interposed between the first display panel 100 and the second display panel 200 in the display area DA.

Meanwhile, although not shown in the peripheral area NA of the liquid crystal display 1000, a sealing member (not shown) made of a sealant or the like is formed along the periphery of the display area DA to surround the display area DA. Accordingly, the first display panel 100 and the second display panel 200 are attached to each other by the sealing member (not shown), and a predetermined space may be defined therebetween. Since the liquid crystal layer 300 is provided in the above-defined space, it is possible to prevent liquid crystal molecules from being discharged to the outside.

Next, a method of manufacturing a liquid crystal display device according to an embodiment of the present disclosure will be described.

FIGS. 6 to 17 are sectional views showing a method of manufacturing the liquid crystal display device shown in FIGS. 1 to 5 in a stepwise manner.

Figure 6:
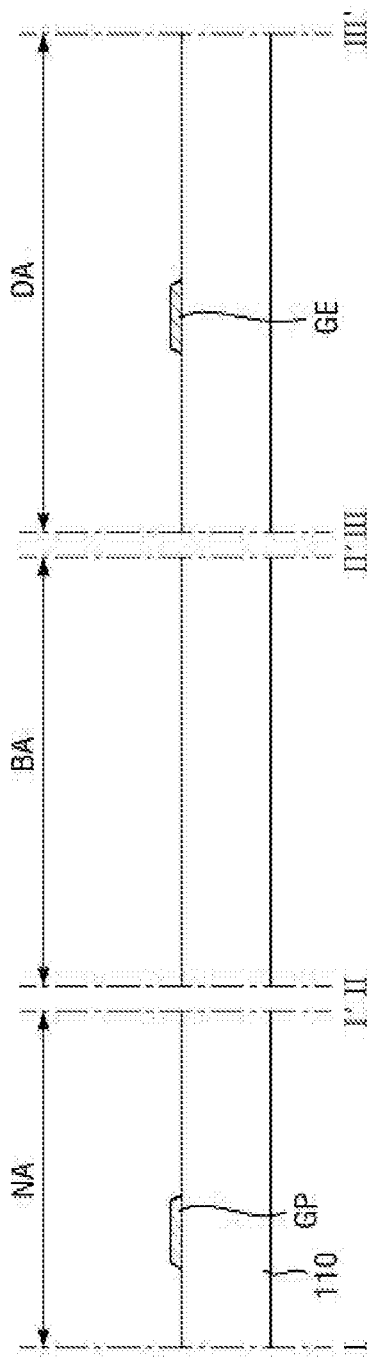
FIGS. 6 to 17 are sectional views showing a method of manufacturing the liquid crystal display device shown in FIGS. 1 to 5 in a stepwise manner.

First, referring to FIGS. 2 and 6, a gate line GL extending in the first direction D1 and a gate electrode GE protruding from the gate line GL are formed on the first substrate 110 in the display area DA. The gate line GL extends to the boundary area BA and the peripheral area NA, and a gate pad GP is formed in the peripheral region NA.

Figure 7:
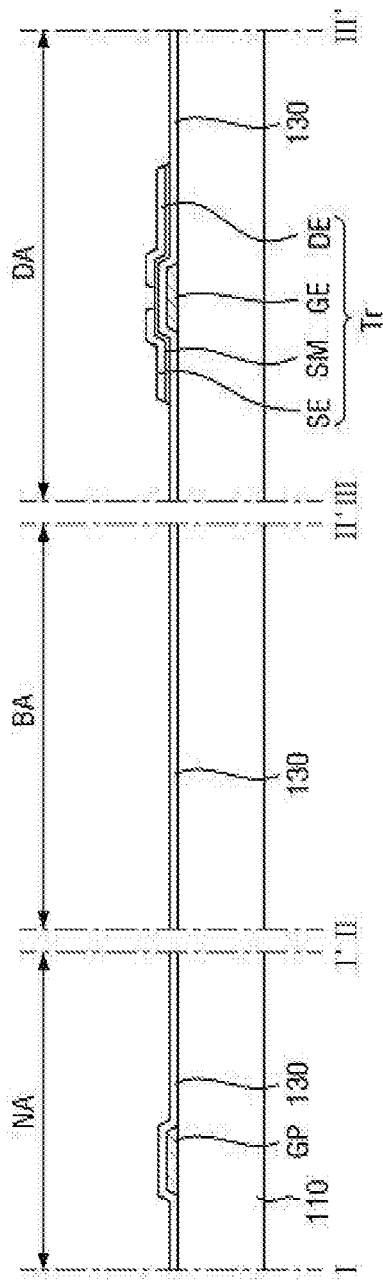

Referring to FIG. 7, a gate insulating film 130 is formed on the first substrate 110 covering the gate line GL, the gate electrodes GE, and gate pads GP. The gate insulating film 130 may cover the entire display area DA, the boundary area BA, and the peripheral area NA.

Subsequently, a data line DL extending in the second direction D2, a source electrode SE, a drain electrode DE, and a semiconductor layer SM are formed on the gate insulating film 130. The data line DL may extend to the boundary area BA and the peripheral area NA.

Figure 8:
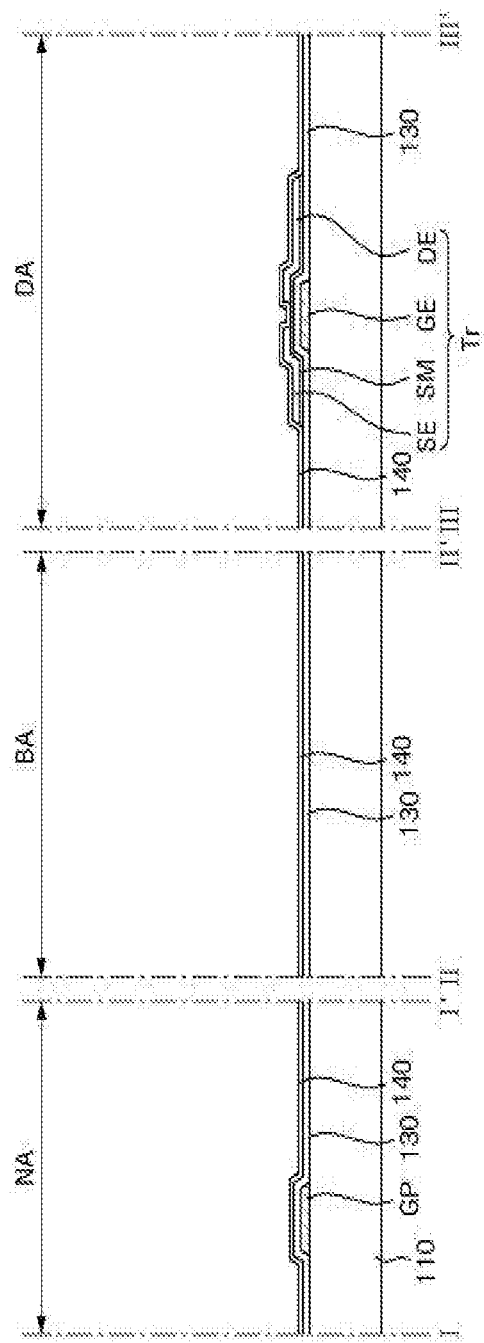

Referring to FIG. 8, a protective film 140 is formed on the gate insulating film 130 covering the data line DL, the source electrode SE, and the drain electrode DE. The protective film 140 may cover the entire display area DA, the boundary area BA, and the peripheral area NA.

Figure 9:
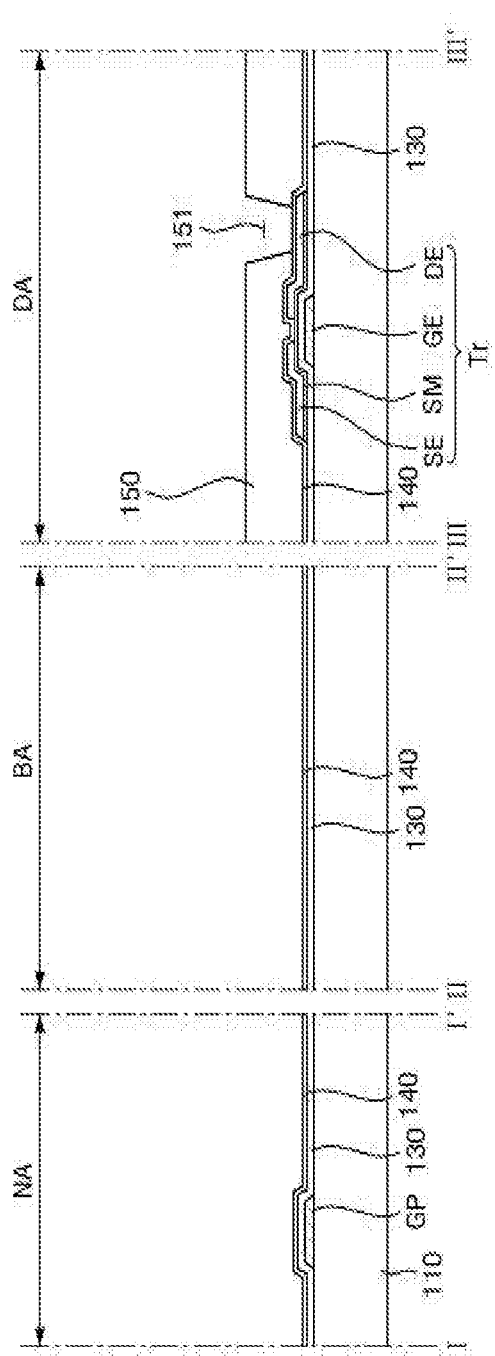

Referring to FIG. 9, a color filter 150 including a fourth opening 151 is formed on the protective film 140 in the display area DA. The fourth opening 151 exposes at least a part of the protective film 140 where the drain electrode DE overlaps in the display area DA. The color filter 150 may be formed of a photosensitive organic material containing a color pigment by exposing and developing the photosensitive organic material.

Figure 10:
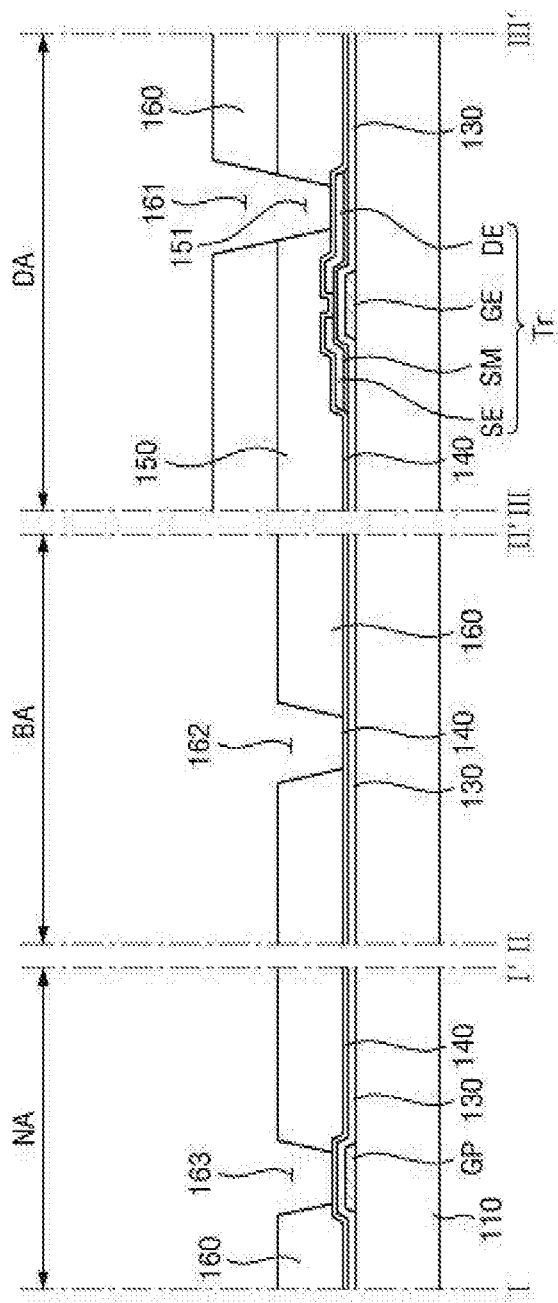

Referring to FIG. 10, a first planarization film 160 is formed on the protective film 140 covering the color filter 150. The first planarization film 160 includes a fifth opening 161 that exposes at least a part of the protective film 140 corresponding to the fourth opening 151 in the display area DA. The first planarization film 160 further includes an alignment liquid control groove 162 that exposes at least a part of the protective film 140 in the boundary area BA, and a sixth opening 163 that exposes at least a part of the protective film 140 disposed on the gate pad GP in the peripheral area NA. The first planarization film 160 may cover the display area DA, the boundary area BA, and the peripheral area NA except the fifth opening 161, the alignment liquid control groove 162, and the sixth opening 163. The first planarization film 160 may be formed of a photosensitive organic material by exposing and developing the photosensitive organic material. The fifth opening portion 161, the alignment liquid control groove 162, and the sixth opening 163 of the first planarization film 160 may be formed simultaneously in one process.

Figure 11:
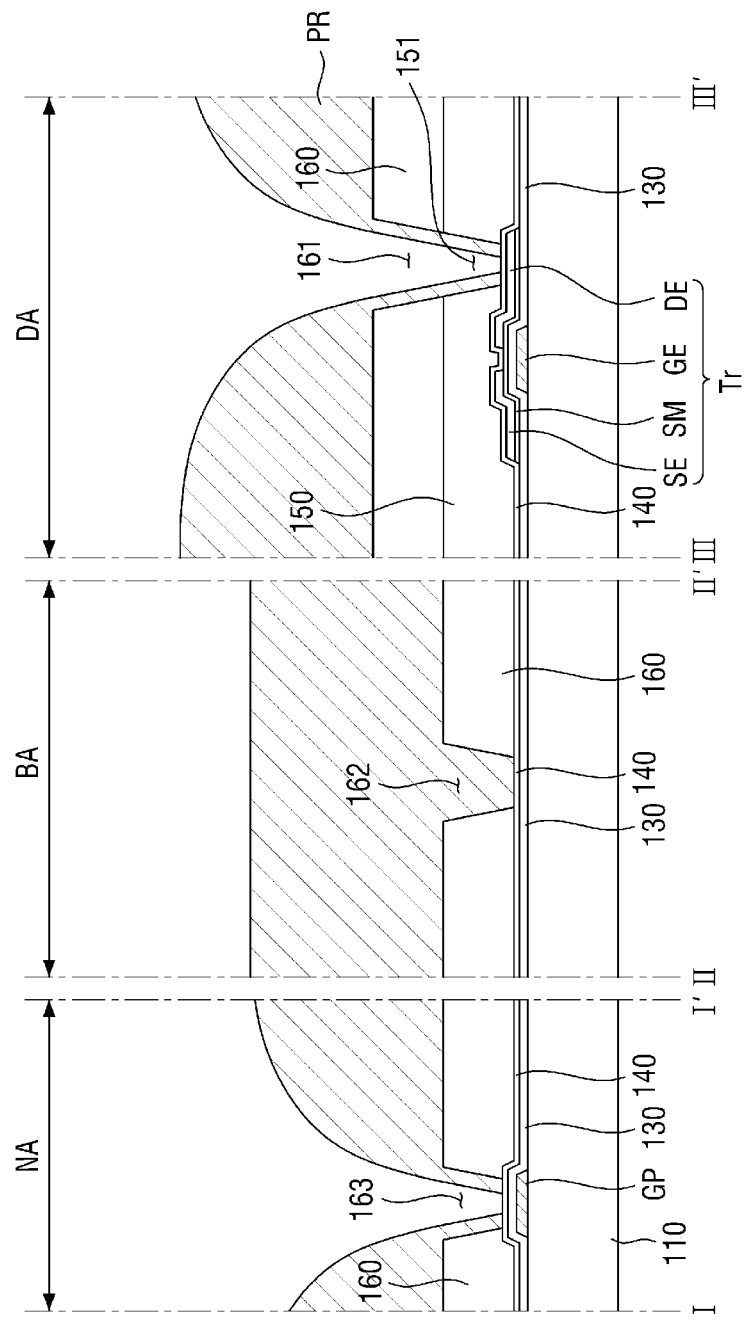

Next, referring to FIG. 11, a resist pattern PR is formed on the first planarization film 160 in the display area DA, the boundary area BA, and the peripheral area NA. The resist pattern PR selectively exposes regions in which a second opening 141 is formed in the display area DA and a first opening 133 and a third opening 143 are formed in the peripheral area NA.

Figure 12:
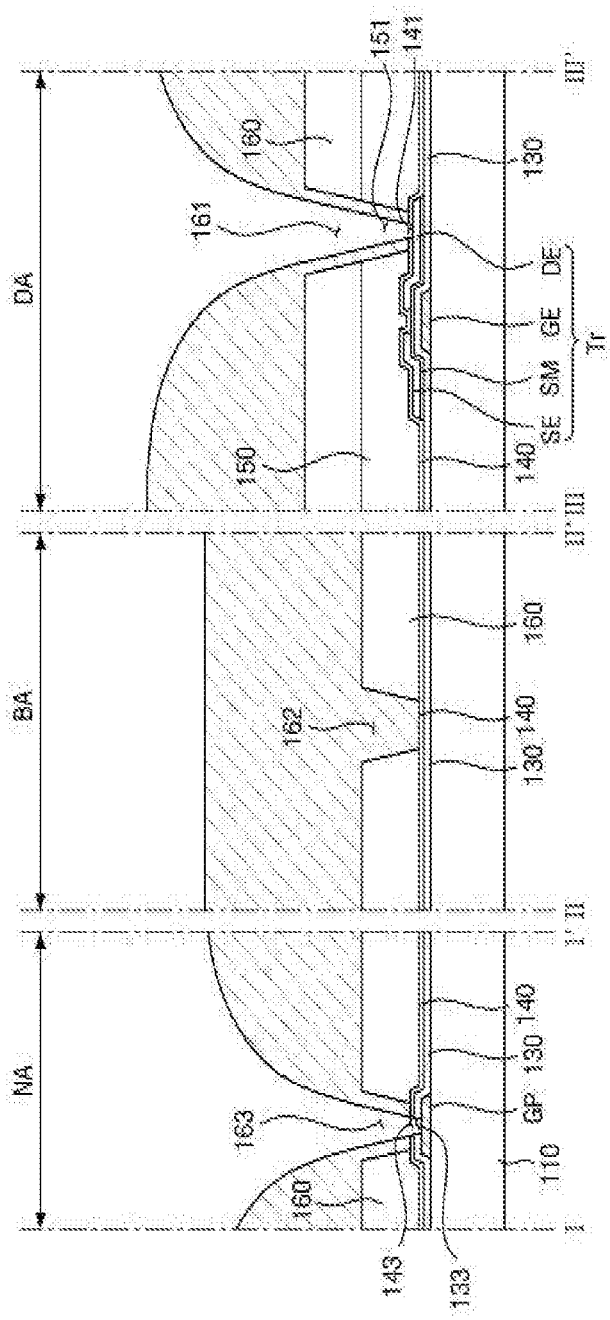

Referring to FIG. 12, the second opening 141 is formed in the display area DA, and the first opening 133 and the third opening 143 are formed in the peripheral area NA by using the resist pattern PR as a mask.

Figure 13:
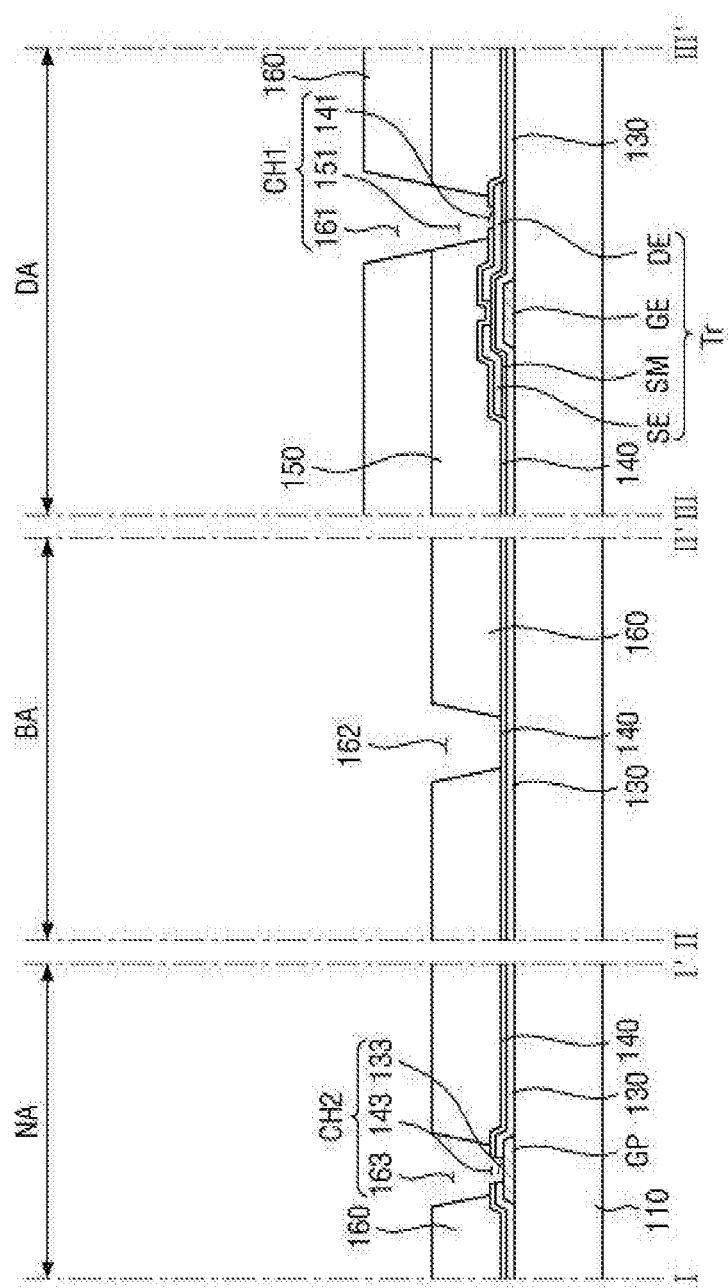

Referring to FIG. 13, the resist pattern PR is removed.

The second opening 141 in the display area DA overlaps the fourth opening 151 and the fifth opening 161 to form a first contact hole CH1. Further, the first opening 133 and third opening 143 in the peripheral area NA overlaps the sixth opening 163 to form a second contact hole CH2.

Figure 14:
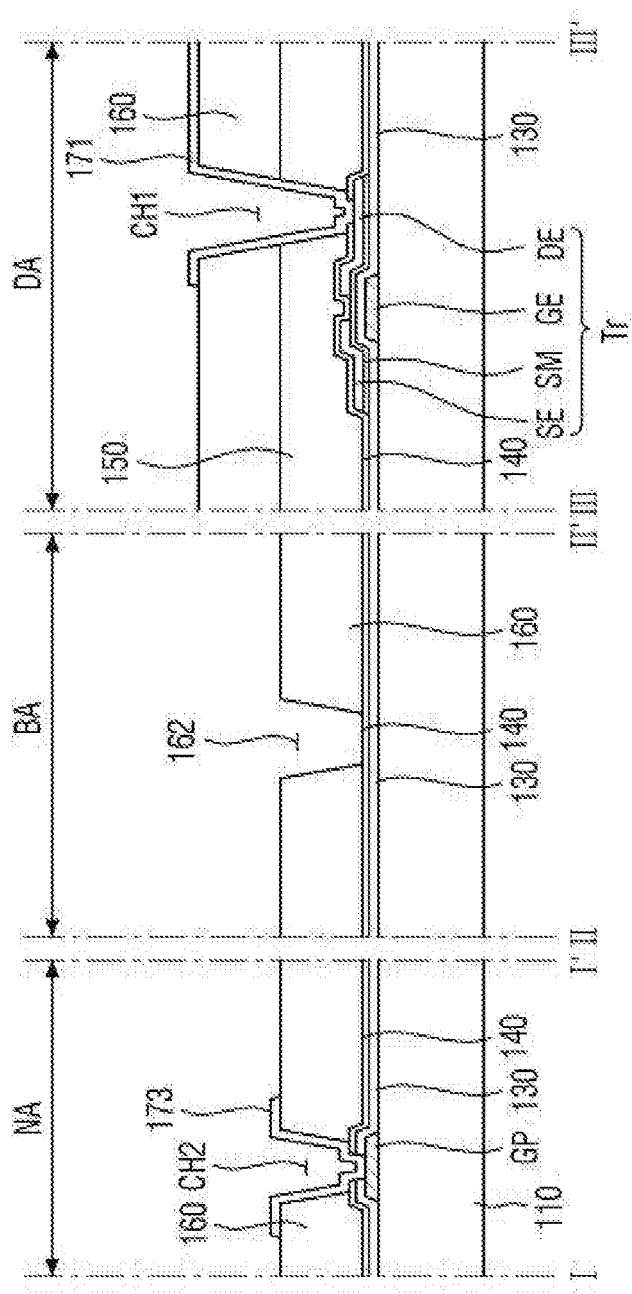

Referring to FIG. 14, a pixel electrode 171 and a connection electrode 173 are formed on the first planarization film 160. For example, a transparent conductive material is deposited on the first planarization film 160 in the display area DA, the boundary area BA, and the peripheral area NA, and then the transparent conductive material is patterned. Subsequently, through an etching process, the pixel electrode 171 is formed in the display area DA, and the connection electrode 173 is formed in the peripheral area NA.

The pixel electrode 171 may be formed to overlap the color filter 150 disposed in the display region DA, and may be connected to the drain electrode DE through the first contact hole CH1. The connection electrode 173 may be formed to overlap the gate pad GP disposed in the peripheral region NA, and may be connected to the gate pad GP through the second contact hole CH2.

Figure 15:
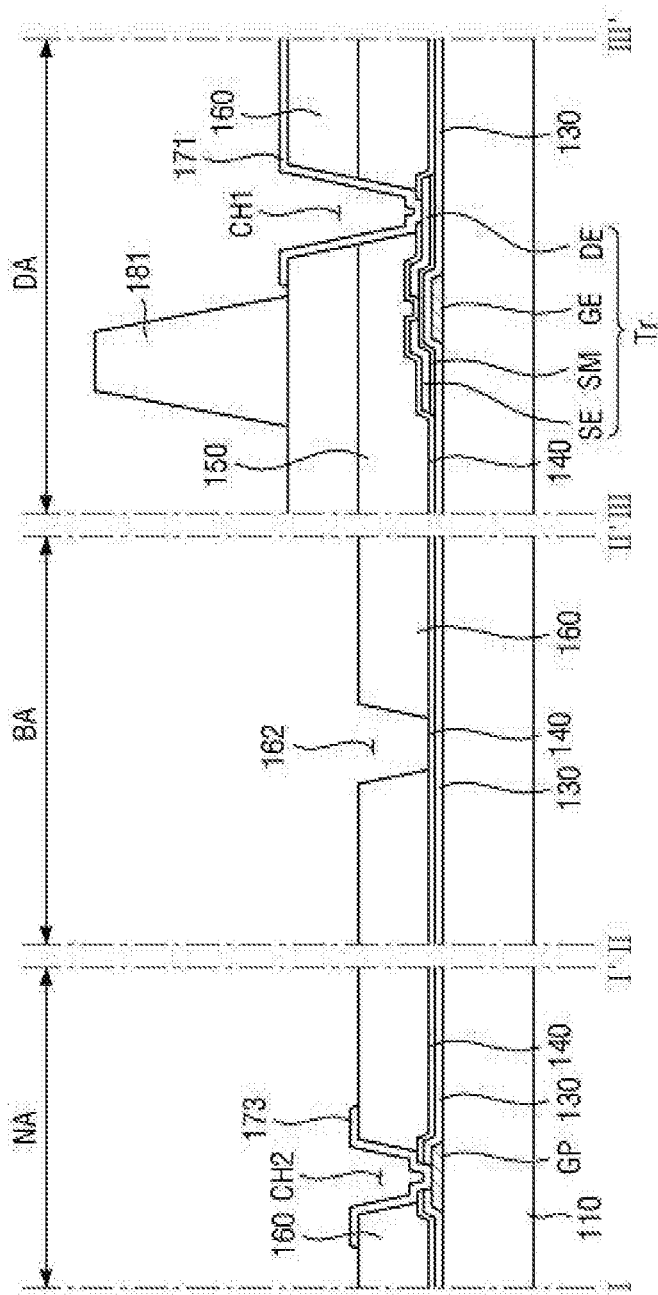

Referring to FIG. 15, a spacer 181 is formed in the display area DA. For example, the spacer 181 may be formed by applying a spacer forming material on the first planarization film 160 and then exposing and developing the spacer forming material.

Figure 16:
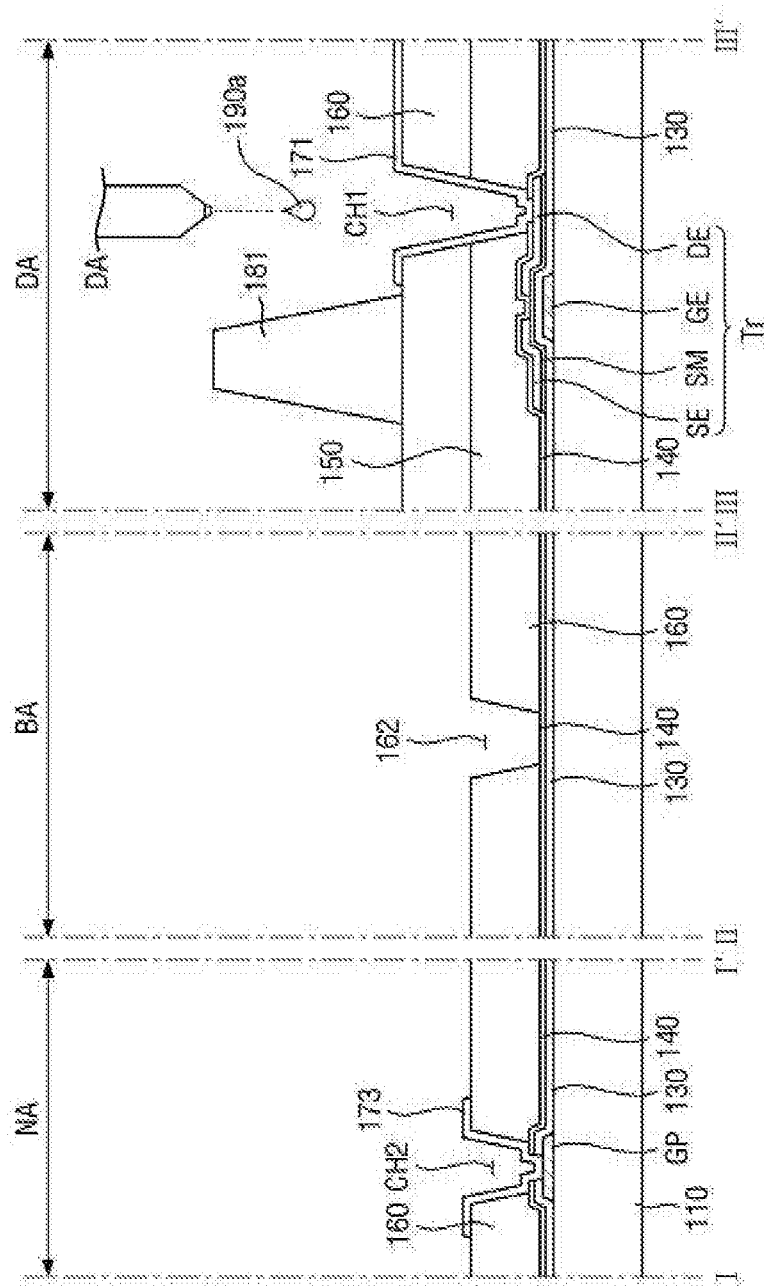

Referring to FIG. 16, subsequently, an alignment liquid 190*a* is applied. The alignment liquid 190*a* may be applied by inkjet printing, nozzle printing, or the like.

Figure 17:
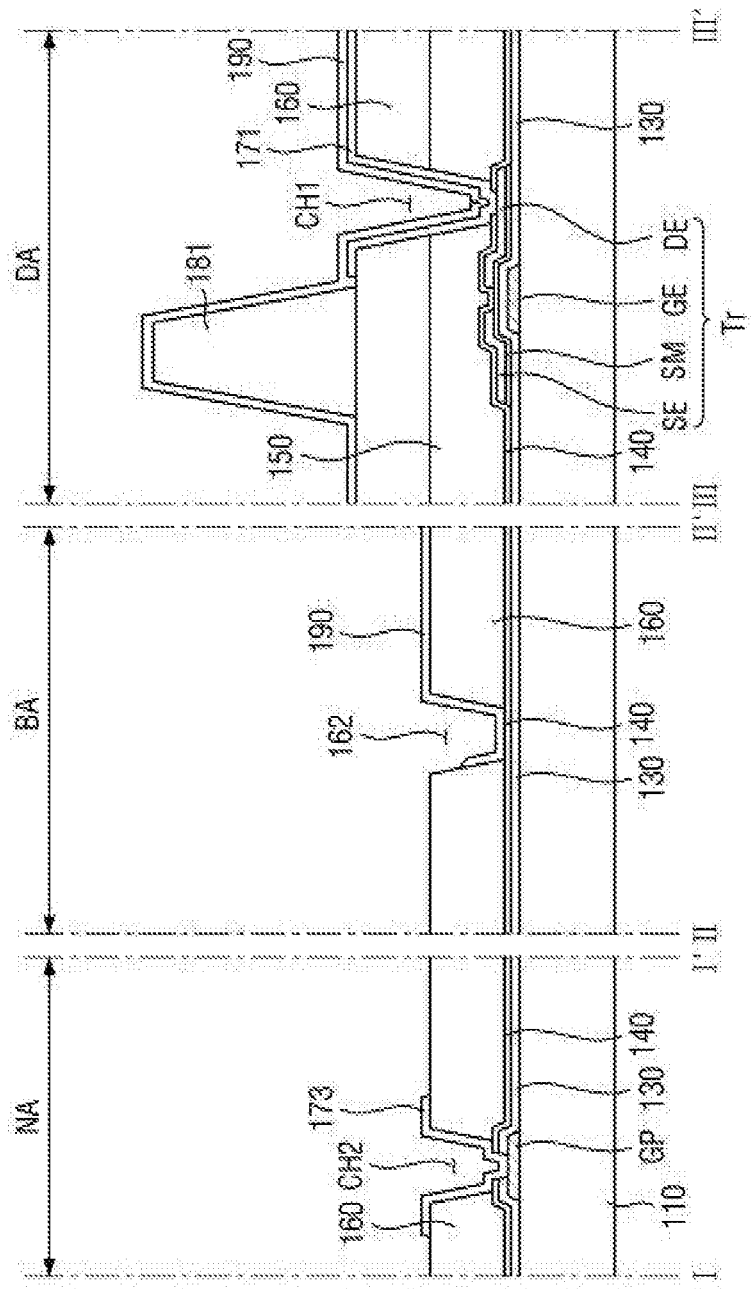

Referring to FIG. 17, the alignment liquid 190*a* is applied onto the entire display area DA. The alignment liquid 190*a* may spread to the boundary area BA and stop within the alignment liquid control groove 162 in the boundary area BA. Resultantly, the alignment liquid 190*a* may be applied to the inside of the alignment liquid control groove 162 in the boundary area BA. Then, the alignment liquid 190*a* is dried to form a form a first alignment film 190.

Then, a second display panel 200 is formed.

Specifically, a light-blocking pattern 280 is formed on a second substrate 210. The light-blocking pattern 280 is patterned at a position facing the first contact hole CH1 that is formed on the first substrate 110 in the display area DA. Further, the light-blocking pattern 280 is patterned to cover the boundary area BA and the peripheral area NA.

Then, a second planarization film 260 is formed on the second substrate 210 covering the light-blocking pattern 280. The second planarization film 260 is formed to cover the display area DA, the boundary area BA, and the peripheral area NA.

Then, a common electrode 270 is formed on the second planarization film 260. The common electrode 270 is formed to cover the display area DA, the boundary area BA, and the peripheral area NA.

Then, a second alignment film 290 is formed on the common electrode 270. The second alignment film 290 is formed to cover the boundary area BA and the inner side of a sealing member (not shown) in the peripheral area NA.

Thereafter, the sealing member (not shown) is formed in the peripheral area NA of the first substrate 110, a liquid crystal layer 300 is formed between the first display panel 100 and the second display panel 200, and the first display panel 100 and the second display panel 200 are attached to each other using the sealing member to manufacture the liquid crystal display device 1000 as shown in FIG. 3. Since various manufacturing processes and methods to form the liquid crystal display device 1000 are well known in the art, a detailed description thereof will be omitted.

Hereinafter, a liquid crystal display device according to another embodiment of the present disclosure will be described.

Figure 18:
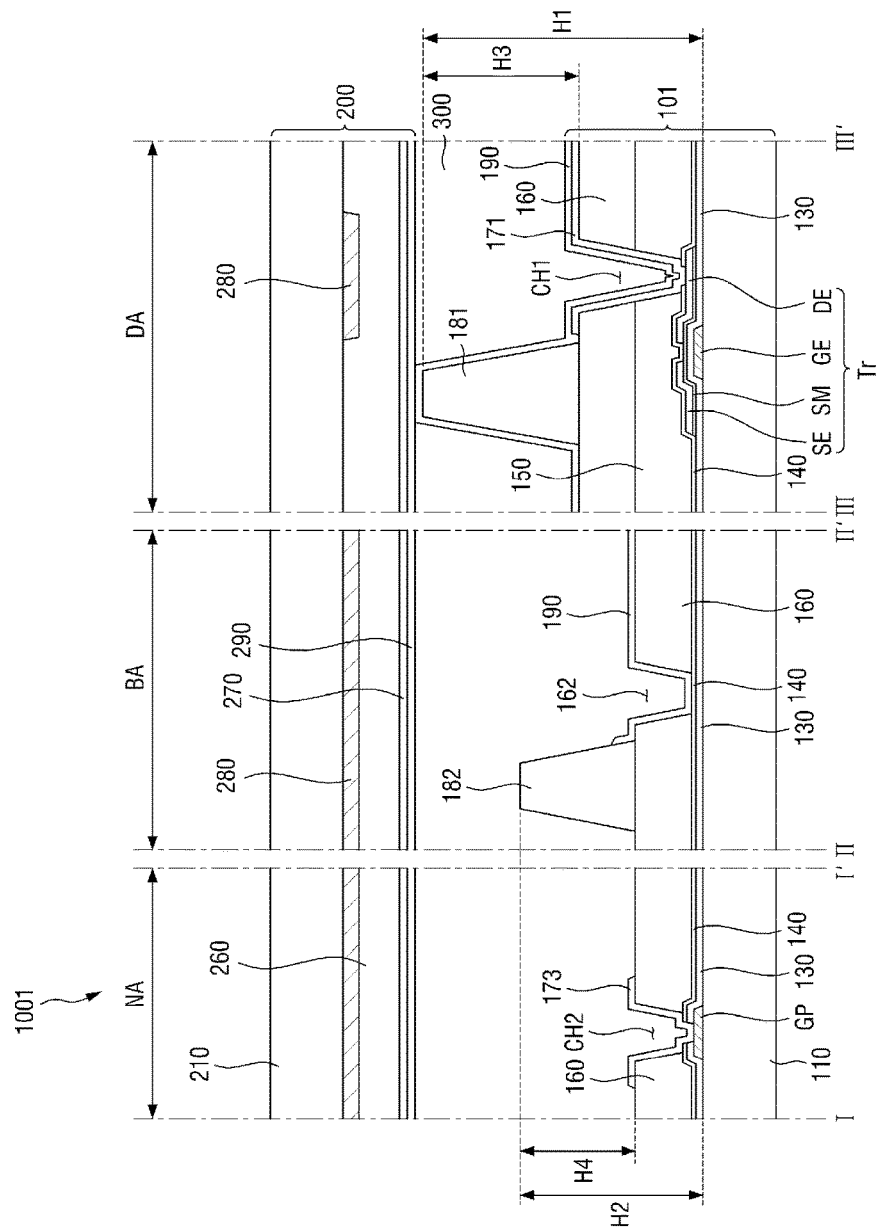
FIG. 18 is a sectional view of a liquid crystal display device according to another embodiment of the present disclosure.
Figure 19:
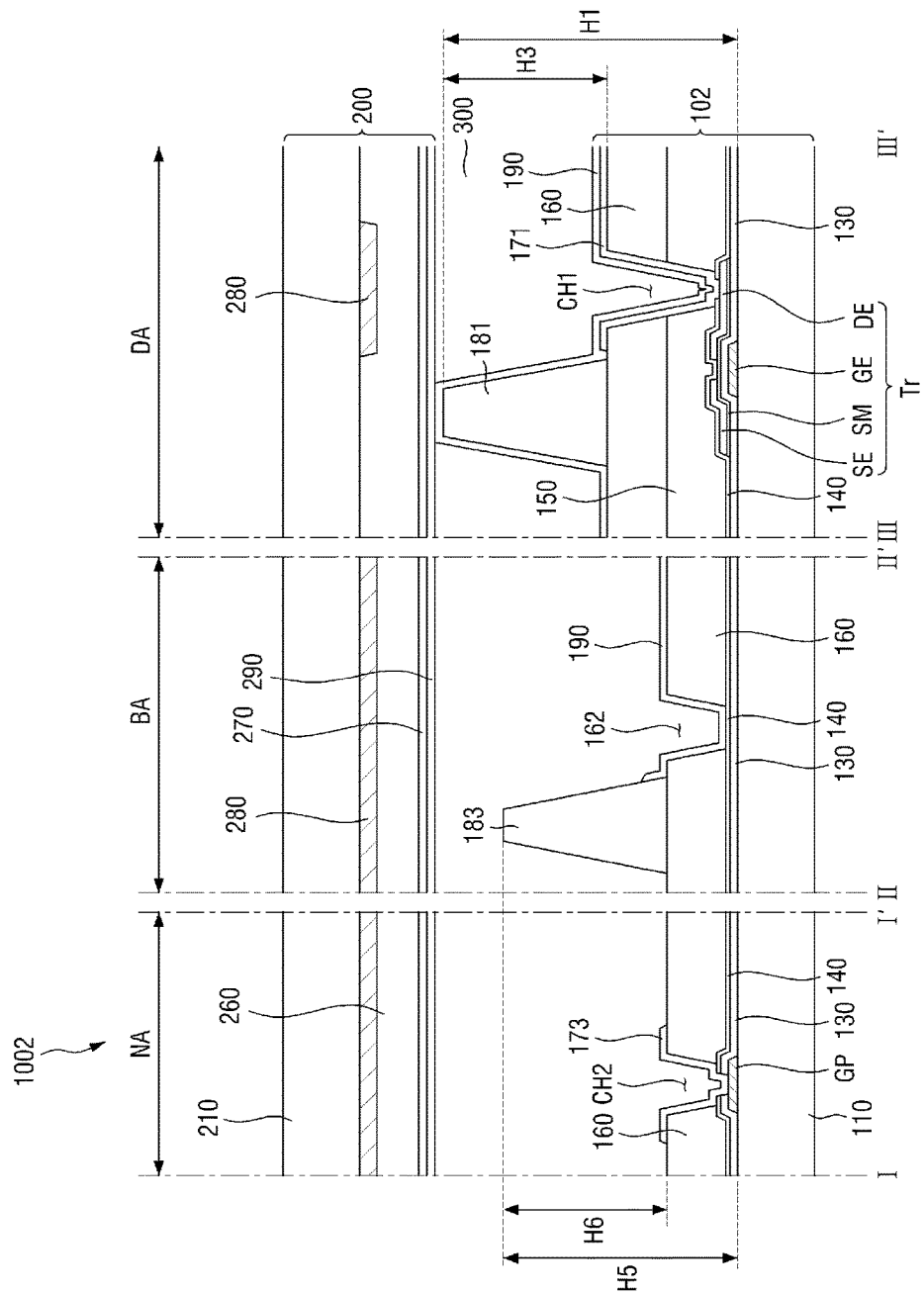
FIG. 19 is a sectional view of a liquid crystal display device according to still another embodiment of the present disclosure.

FIGS. 18 and 19 are sectional views of liquid crystal display devices according to other embodiments of the present disclosure.

Referring to FIG. 18, a liquid crystal display device 1001 is different from the liquid crystal display device 1000 shown in FIG. 3 in that the liquid crystal display device 1001 further include a protrusion 182 formed in a space between the alignment liquid control groove 162 and the second contact hole CH2.

Specifically, the protrusion 182 may be disposed on the first planarization film 160 between the alignment liquid control groove 162 and the second contact hole CH2. The protrusion 182 may be disposed to extend in one direction along the outer periphery of the alignment liquid control groove 162. The protrusion 182 may be formed at the same time together with the spacer 181 that is formed on the first planarization film 160 in the display area DA. The protrusion 182 may be made of the same organic insulating material as the spacer 181, and may have photosensitivity.

The spacer 181 is formed to have a first height H1 from one side of the first substrate 110 serving as a main column spacer maintaining a cell gap between the first display panel 100 and the second display panel 200 in the display area DA.

The protrusion 182 is formed to have a second height H2 that is shorter than the first height H1 serving as a sub column spacer in the boundary area BA addition to the main column spacer in the display area DA.

In the liquid crystal display device 1001, the first height H1 of the spacer 181 measured from one side of the first substrate 110 and the second height H2 of the protrusion 182 measured from one side of the first substrate 110 to be different from each other.

Specifically, as shown in FIG. 18, the height H3 of the spacer 181 measured with respect to one side of the first planarization film 160 may be higher than the height H4 of the protrusion 182 measured with respect to one side of the first planarization film 160. The spacer 181 and the protrusion 182 may be formed using a halftone mask.

Referring to FIG. 19, a liquid crystal display device 1002 is different from the liquid crystal display device 1000 shown in FIG. 3 in that the liquid crystal display device 1002 further include a protrusion 183 formed in a space between the alignment liquid control groove 162 and the second contact hole CH2. Specifically, the height H3 of the spacer 181 measured from one side of the first planarization film 160 may be the same as the height H6 of the protrusion 183 measured from one side of the first planarization film 160.

The spacer 181 is formed to have a first height H1 from one side of the first substrate 110.

Meanwhile, the protrusion 183 is formed to have a second height H5 from one side of the first substrate 100.

Since the spacer 181 overlaps the color filter 150 that is formed on the first planarization film 160 in the display area DA while the protrusion 183 is formed directly on the first planarization film 160 in the boundary area BA, the first height H1 of the spacer 181 measured from one side of the first substrate 110 is higher than the second height H2 of the protrusion 183 measured from one side of the first substrate 110.

Therefore, as described above, even when the spacer 181 and the protrusion 183 have the same thickness, the spacer 181 may serve as a main column spacer maintaining a gap between the first display panel 100 and the second display panel 200 in the display area DA, and the protrusion 183 may serve as a sub column spacer in the boundary area BA.

Further, since the spacer 181 and protrusion 183 may be formed without using a halftone mask, there is an advantage of reducing process costs.

Figure 20:
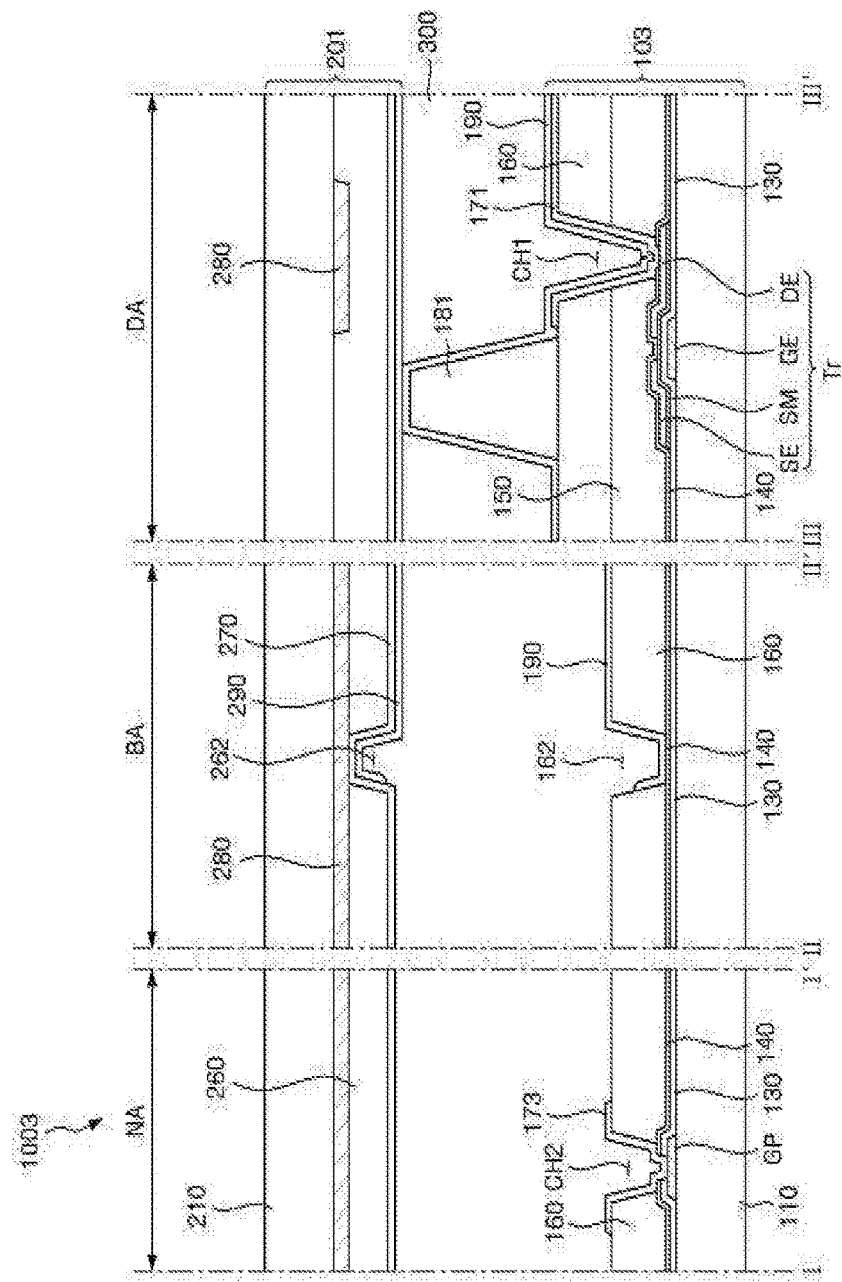
FIG. 20 is a sectional view of a liquid crystal display device according to still another embodiment of the present disclosure.

FIG. 20 is a sectional view of a liquid crystal display device according to still another embodiment of the present disclosure.

Referring to FIG. 20, a liquid crystal display device 1003 is different from the liquid crystal display device 1000 shown in FIG. 3 in that the liquid crystal display device 1003 further includes an alignment liquid control groove 262 formed in the second planarization film 260 of the second display panel 200.

Specifically, the alignment liquid control groove 262 may be disposed in the boundary area BA or the peripheral area NA. In some embodiments, the alignment liquid control groove 262 may be disposed to face the alignment liquid control groove 162 formed in the first display panel 100.

The alignment liquid control groove 262 disposed in the second display panel 200 may be formed in the same manner as the alignment liquid control groove 162 disposed in the first display panel 100. Therefore, a detailed description thereof will be omitted.

A common electrode 270 may be disposed on the second planarization film 260. The common electrode 270 may also be disposed in the boundary area BA and the peripheral area NA.

A second alignment film 290 may be disposed on the common electrode 270 in the display area DA. The second alignment film 290 may also be disposed on the inner side of the alignment liquid control groove 262 in the boundary area BA.

Hereinafter, the arrangement relationships of the alignment liquid control grooves and the protrusions will be described.

FIGS. 21 to 25 are plan views showing various arrangement relationships of the alignment liquid control grooves and protrusions in the liquid crystal display devices according to other embodiments of the present disclosure.

Figure 21:
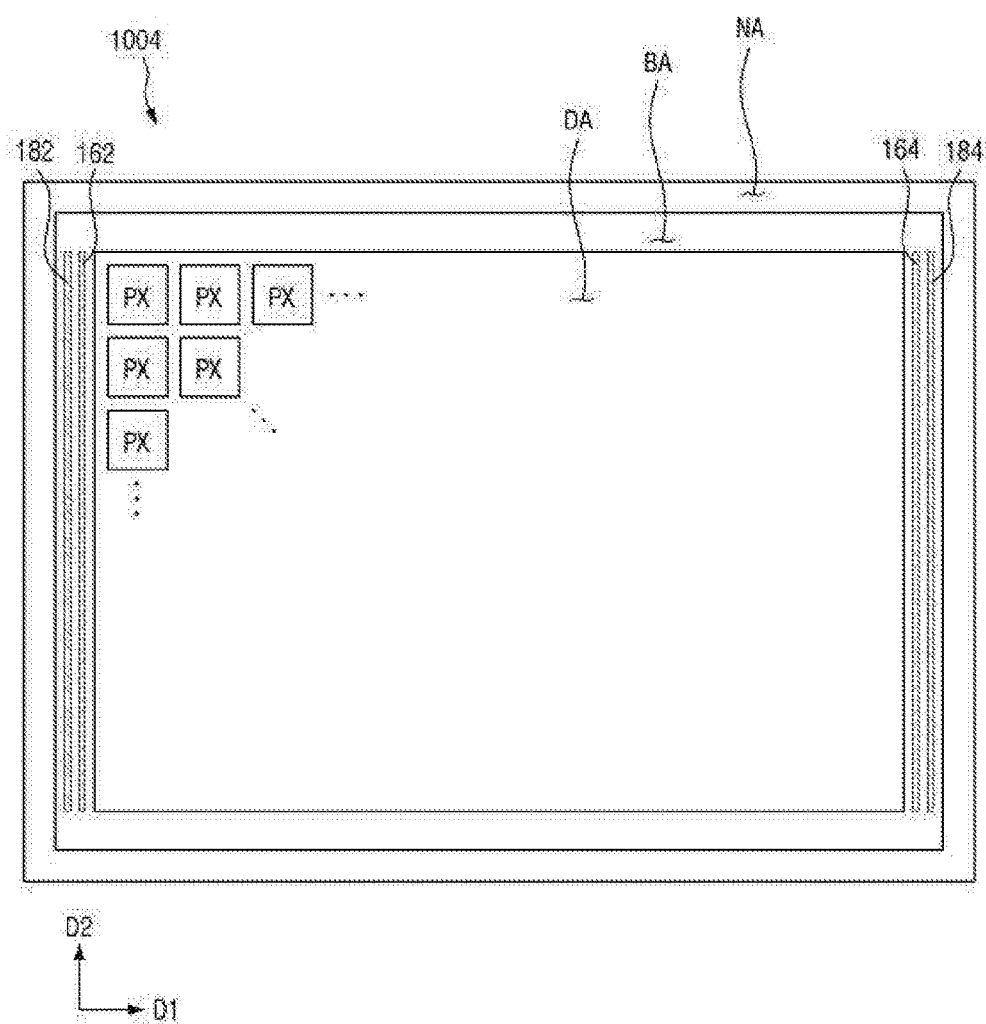
FIGS. 21 to 25 are plan views showing various arrangement relationships of the alignment liquid control grooves and protrusions in liquid crystal display devices according to other embodiments of the present disclosure.

First, referring to FIG. 21, a liquid crystal display device 1004 may include an alignment liquid control groove 162 extending in the second direction D2 along the outer periphery of the display area DA and having a bar shape, and a protrusion 182 extending in the second direction D2 along the outer periphery of the alignment liquid control groove 162 and having a bar shape.

When the alignment liquid control groove 162 and the protrusion 182 are disposed adjacent to each other, the protrusion 182 and the alignment liquid control groove 162 form a large dam-shaped step, thereby effectively blocking an overflow of the alignment liquid 190a from the alignment liquid crystal groove 162.

Further, the liquid crystal display device 1004 may further include an alignment liquid control groove 164 and a protrusion 184 disposed in an opposite side of the display area DA from the alignment liquid control groove 162 and the protrusion 182.

Figure 22:
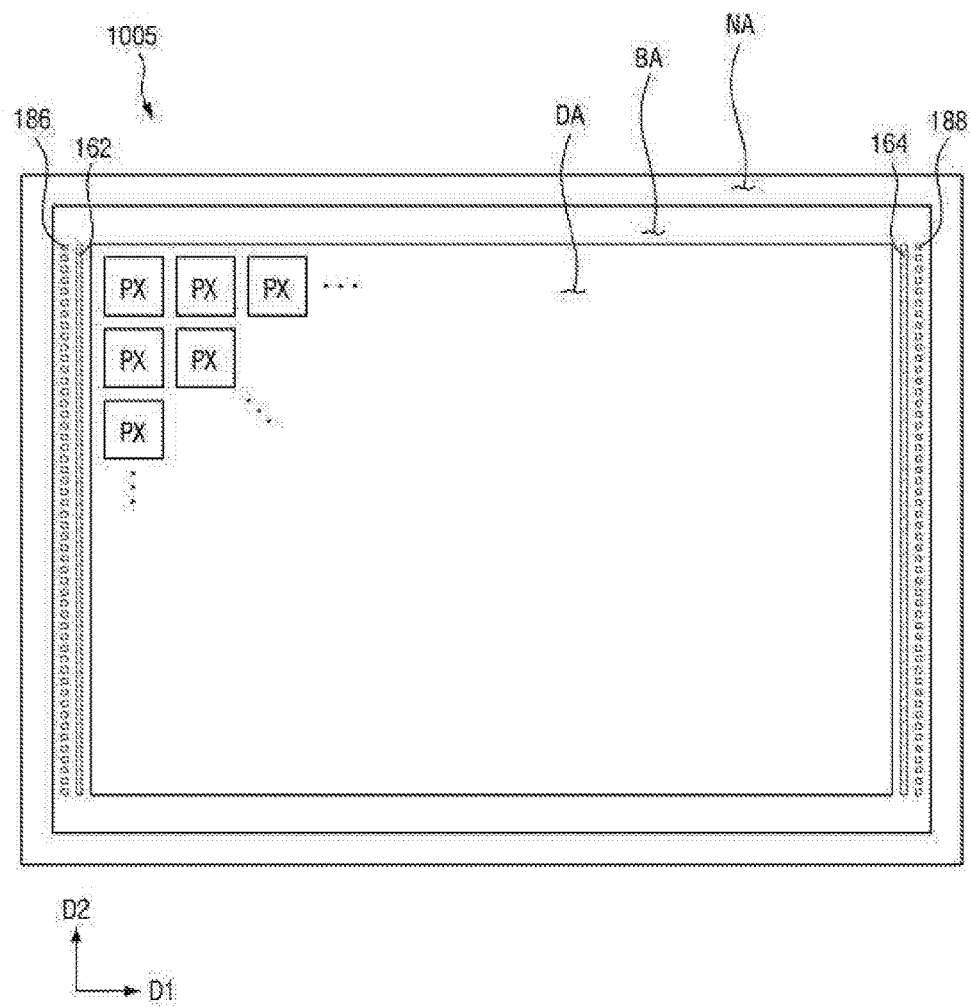

Next, referring to FIG. 22, a liquid crystal display device 1005 may include an alignment liquid control groove 162 extending in the second direction D2 along the outer periphery of the display area DA and having a bar shape, and a plurality of protrusions 186 extending in the second direction D2 along the outer periphery of the alignment liquid control groove 162 as being spaced apart from each other in a stitch pattern.

Further, the liquid crystal display device 1005 may further include an alignment liquid control groove 164 and a plurality of protrusions 188 disposed in an opposite side of the display area DA from the alignment liquid control groove 162 and the protrusions 186.

Figure 23:
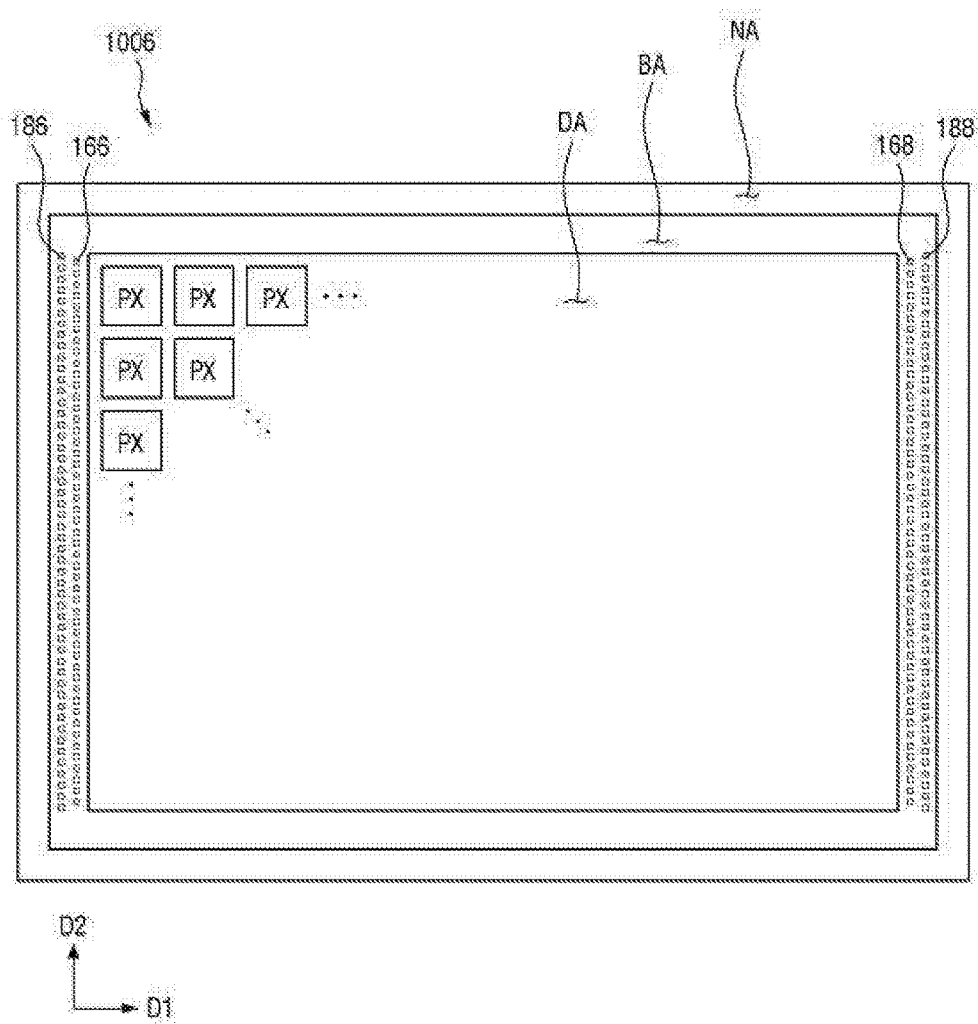

Next, referring to FIG. 23, a liquid crystal display device 1006 may include alignment liquid control grooves 166 extending in the second direction D2 along the outer periphery of the display area DA as being spaced apart from each other by a predetermined distance in a stitch pattern, and a plurality of protrusions 186 extending in the second direction D2 along the outer periphery of the alignment liquid control groove 162 as being spaced apart from each other by a predetermined distance in a stitch pattern.

The alignment liquid control grooves 166 and the protrusions 186 may be arranged in a zigzag fashion to be shifted from each other. Therefore, a portion where the alignment liquid control grooves 166 are formed may collect the alignment liquid 190a, and a portion where the protrusions 186 are formed may serves as a dam preventing the alignment liquid 190a from spreading toward the peripheral area NA.

Further, the liquid crystal display device 1006 may further include an alignment liquid control grooves 168 and a plurality of protrusions 188 disposed in an opposite side of the display area DA from the alignment liquid control grooves 166 and the protrusions 186.

Figure 24:
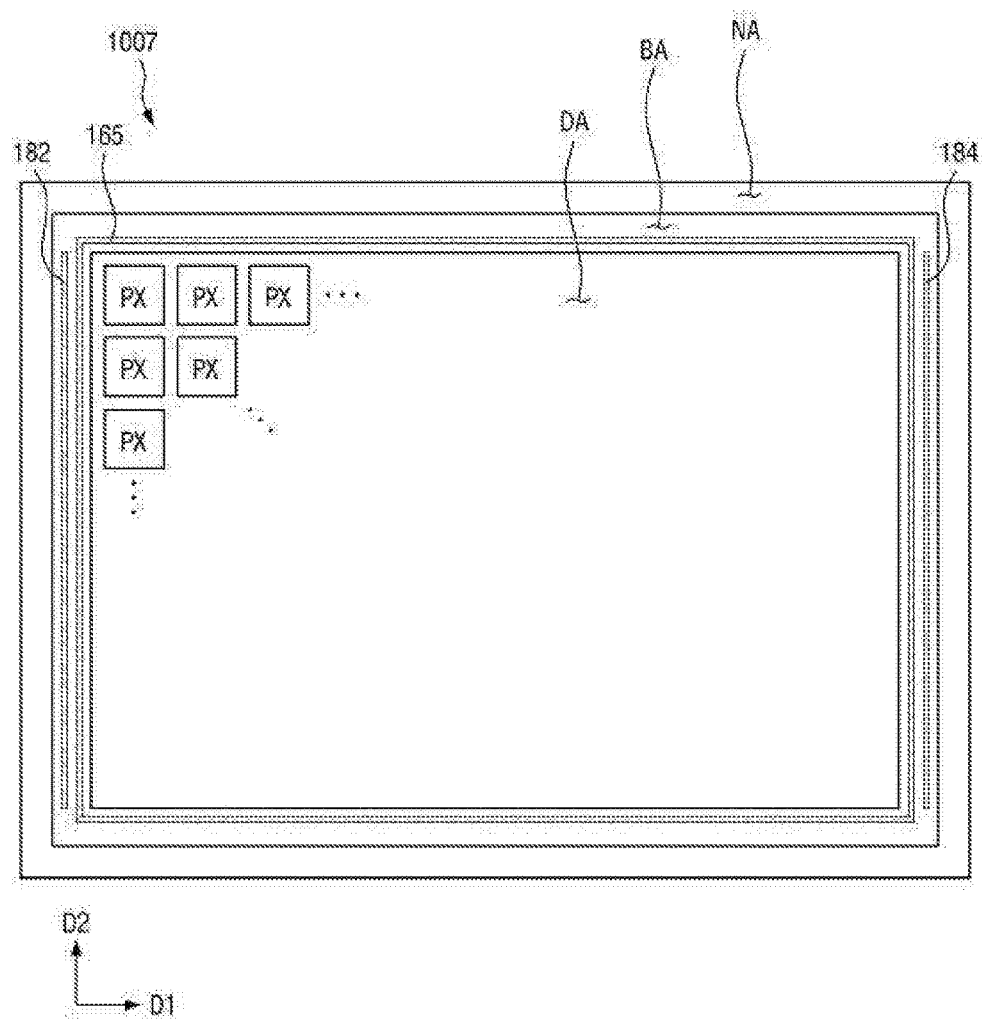

Next, referring to FIG. 24, a liquid crystal display device 1007 may include an alignment liquid control groove 165 surrounding the outer periphery of the display area DA, and a protrusion 182 extending in the second direction D2 along the outer periphery of the alignment liquid control groove 165 and having a bar shape.

When the alignment liquid control groove 165 and the protrusion 182 are disposed adjacent to each other, the protrusion 182 and the alignment liquid control groove 165 form a large dam-shaped step, thereby effectively blocking an overflow of the alignment liquid 190a from the alignment liquid control groove 165.

Further, the alignment liquid control groove 165 extends in the first direction D1 of the display area DA to control the spreading of the alignment liquid 190a in the first direction D1 as well as in the second direction D2.

Further, the liquid crystal display device 1007 may further include a protrusion 184 disposed in an opposite side of the display area DA from the protrusion 182.

Figure 25:
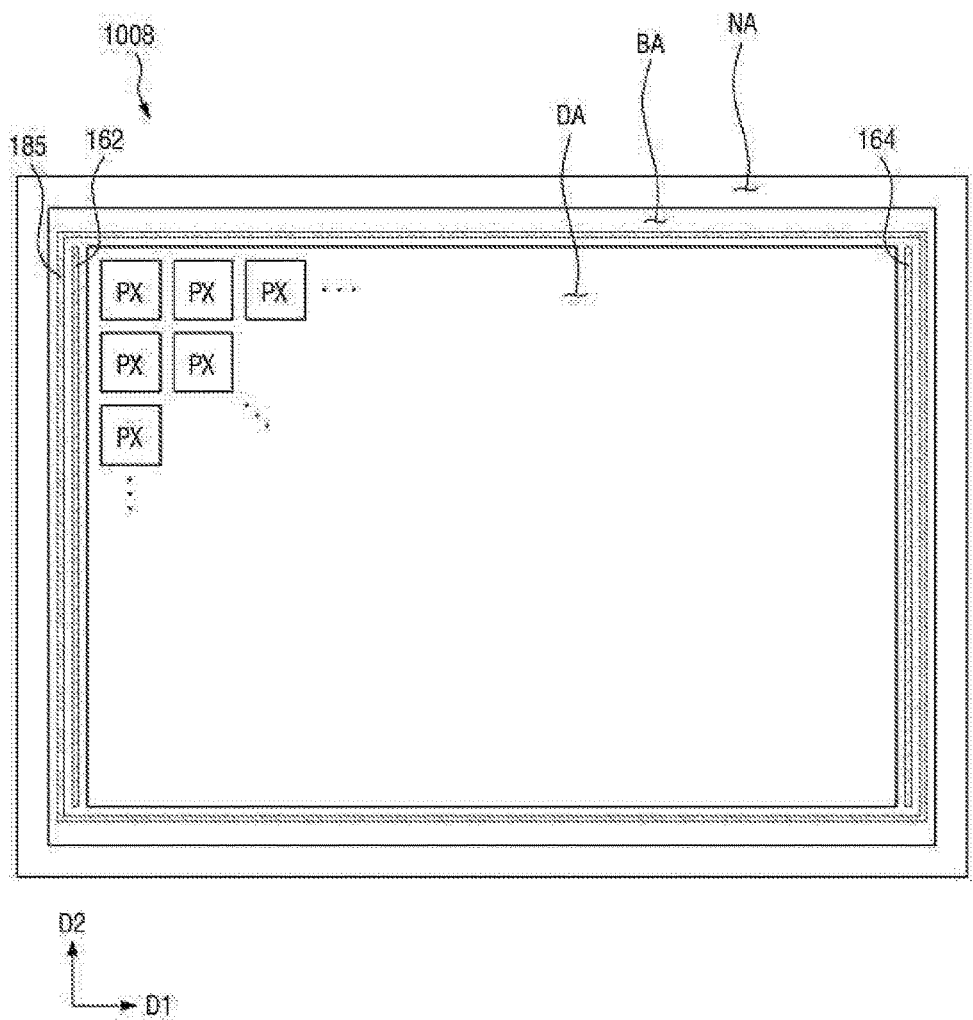

Next, referring to FIG. 25, a liquid crystal display device 1008 may include an alignment liquid control groove 162 extending in the second direction D2 along the outer periphery of the display area DA and having a bar shape, and a protrusion 185 surrounding the outer periphery of the display area DA.

When the alignment liquid control groove 162 and the protrusion 185 are disposed adjacent to each other, the protrusion 185 and the alignment liquid control groove 162 form a large dam-shaped step, thereby effectively blocking an overflow of the alignment liquid 190a from the alignment liquid crystal groove 162.

Further, the protrusion 185 extends in the first direction D1 of the display area DA to control the spreading of the alignment liquid 190a in the first direction D1 as well as the second direction D2.

Further, the liquid crystal display device 1008 may further include an alignment liquid control groove 164 disposed in an opposite side of the display area DA from the alignment liquid control groove 162.

As described above, according to the liquid crystal display devices of embodiments of the present disclosure, effects thereof are as follows.

It is possible to control the spreadability of an alignment liquid by providing an alignment liquid control groove.

Further, it is possible to control the spreadability of an alignment liquid by providing a protrusion adjacent the alignment liquid control groove.

Therefore, it is possible to prevent the alignment liquid from spreading toward a peripheral area by providing the alignment liquid control groove and the protrusion.

The effects of the present disclosure are not limited by the foregoing, and other various effects are anticipated herein.

In concluding the detailed description, those skilled in the art will appreciate that many variations and modifications can be made to the exemplary embodiments disclosed herein without substantially departing from the principles of the present disclosure. Therefore, the disclosed embodiments of the present disclosure are used in a generic and descriptive sense only and not for purposes of limitation.

What is claimed is:

1. A liquid crystal display device including a display area, a peripheral area, and a boundary area between the display area and the peripheral area and comprising:
   a first substrate;
   a switching element disposed on the first substrate in the display area;
   a pad disposed on the first substrate in the peripheral area and electrically connected with the switching element;
   a protective film disposed on the first substrate in the display area, the peripheral area, and the boundary area, and covering the switching element and the pad;
   a color filter disposed on the protective film in the display area;
   a first planarization film covering the color filter and contacting the protective film in the boundary area and the peripheral area; and
   a first alignment film disposed on the first planarization film without overlapping the pad,
   wherein the first planarization film is provided with a first opening overlapping the pad and at least one second opening formed in the boundary area,
   wherein the first alignment film overlaps the at least one second opening, and
   wherein the first alignment film directly contacts the protective film and the first planarization film in the at least one second opening.

2. The liquid crystal display device of claim 1, wherein the at least one second opening continuously extends along one direction.

3. The liquid crystal display device of claim 1, further comprising:
   a gate line extending along a first direction on the first substrate and connected with the switching element and the pad,
   wherein the at least one second opening extends along a second direction intersecting the first direction.

4. The liquid crystal display device of claim 1, further comprising:
   a spacer disposed on the first planarization film in the display area; and
   a protrusion disposed on the first planarization film in the boundary area, the protrusion disposed in a region between the first opening and the at least one second opening,
   wherein the first alignment film directly contacts the protrusion.

5. The liquid crystal display device of claim 4, wherein the spacer and the protrusion are made of the same material.

6. The liquid crystal display device of claim 4, wherein a height of the spacer measured from one side of the first substrate is higher than a height of the protrusion measured from one side of the first substrate.

7. The liquid crystal display device of claim 4, wherein a height of the spacer measured from one side of the first planarization film is substantially the same as a height of the protrusion measured from one side of the first planarization film.

8. The liquid crystal display device of claim 4, wherein a height of the spacer measured from one side of the first planarization film is higher than a height of the protrusion measured from one side of the first planarization film.

9. The liquid crystal display device of claim 1, further comprising:
   a second substrate facing the first substrate;

a light-blocking pattern disposed on a surface of the second substrate in the boundary area and the peripheral area, the surface of the second substrate facing the first substrate;

a second planarization film disposed on the light-blocking pattern;

a second alignment film disposed on the second planarization film, wherein a third opening is formed in the second planarization film, wherein the second alignment film overlaps the third opening, and wherein the switching element comprises:

a gate electrode disposed on the first substrate;

a gate insulating film disposed on the gate electrode;

a semiconductor pattern disposed on the gate insulating film; and a source electrode and drain electrode electrically connected with the semiconductor pattern, wherein the gate electrode and the pad are made of the same material.

10. The liquid crystal display device of claim 1, further comprising:

a connection electrode disposed on the first planarization film in the peripheral area and connected with the pad through the first opening.

11. The liquid crystal display device of claim 10, further comprising:

a pixel electrode disposed on the first planarization film in the display area and electrically connected with the switching element, wherein the pixel electrode and the connection electrode are made of the same material.

12. A liquid crystal display device including a display area, a peripheral area around the display area, and a boundary area between the display area and the peripheral area and comprising:

a first substrate;

a pad disposed on the first substrate in the peripheral area;

a protective film disposed on the first substrate in the display area, the peripheral area, and the boundary area;

a color filter disposed on the protective film in the display area;

a planarization film covering the color filter in the display area, contacting the protective film in the boundary area and the peripheral area, and having one or more openings that expose at least a part of the protective film in the boundary area; and an alignment film disposed on the planarization film without overlapping the pad, wherein the alignment film overlaps the one or more openings, and wherein the alignment film directly contacts the protective film and the planarization film in the one or more openings.

13. The liquid crystal display device of claim 12, wherein the one or more openings are arranged in parallel in one direction at opposing sides of the display area.

14. The liquid crystal display device of claim 12, wherein the one or more openings are arranged in a bar shape or a stitch pattern along one direction.

15. The liquid crystal display device of claim 12, wherein the one or more openings surround an outer periphery of the display area.

16. The liquid crystal display device of claim 12, further comprising:

one or more spacers disposed on the planarization film in the display area; and one or more protrusions disposed on the planarization film in the boundary area in a region between the peripheral area and the one or more openings, wherein the alignment film directly contacts the one or more protrusions.

17. The liquid crystal display device of claim 16, wherein the one or more openings continuously extend along one direction, and the one or more protrusions continuously extend along an outer periphery of the one or more openings.

18. The liquid crystal display device of claim 16, wherein the one or more openings and the one or more protrusions are arranged in a zigzag fashion to be shifted along one direction.

19. The liquid crystal display device of claim 16, wherein the one or more openings surround an outer periphery of the display area, and the one or more protrusions surround an outer periphery of the one or more openings.

* * * * *